United States Patent
Mahadevan et al.

(10) Patent No.: US 12,381,960 B2
(45) Date of Patent: *Aug. 5, 2025

(54) METHODS AND SYSTEMS FOR USER DATA MANAGEMENT

(71) Applicant: I OWN MY DATA, LLC, Menlo Park, CA (US)

(72) Inventors: Rohan Mahadevan, Menlo Park, CA (US); Harsha Elchuri, Telangana (IN)

(73) Assignee: I OWN MY DATA, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/370,783

(22) Filed: Sep. 20, 2023

(65) Prior Publication Data
US 2024/0340353 A1    Oct. 10, 2024

Related U.S. Application Data

(63) Continuation of application No. 18/297,606, filed on Apr. 8, 2023, now Pat. No. 11,811,524.

(51) Int. Cl.
*H04L 67/50* (2022.01)
*H04L 9/40* (2022.01)
(Continued)

(52) U.S. Cl.
CPC ............ *H04L 67/535* (2022.05); *H04L 63/08* (2013.01); *H04L 67/306* (2013.01); *H04L 67/53* (2022.05); *H04L 67/54* (2022.05)

(58) Field of Classification Search
CPC ....... H04L 67/53; H04L 67/306; H04L 67/54; H04L 67/564; H04L 67/568
(Continued)

(56) References Cited

U.S. PATENT DOCUMENTS

| 10,997,240 | B1 * | 5/2021 | Aschner | ............... H04L 67/535 |
| 11,257,019 | B2 * | 2/2022 | Xu | ..................... G06Q 30/0256 |

(Continued)

FOREIGN PATENT DOCUMENTS

| AU | 2013289042 A1 * | 1/2015 | ....... G06F 17/30035 |
| AU | 2014240202 A1 * | 4/2015 | ....... G06F 17/30091 |

(Continued)

*Primary Examiner* — Khanh Q Dinh

(74) *Attorney, Agent, or Firm* — NIXON PEABODY LLP

(57) ABSTRACT

The present disclosure generally relates to systems and methods for user authentication and data management. Information involving a user's interactions with an online platform is stored on a user device that is used to access the platform. Such information may include user authentication information, personal information, and an interaction history of events, such as logins, purchases, and checkouts. When providing information to the online platform, the user is given the option of what information to provide and, in some cases, the user may opt to provide tokenized information in lieu of sensitive information that the user would prefer not to share. Also, the user may selectively provide information about his or her interaction history, thereby permitting the online platform to establish a trust level of the user using information from the user device. Thus, information about the user's account with the online platform is safely stored on the user device permitting the user to be the custodian of such data, including deciding what information to share with online platforms.

14 Claims, 31 Drawing Sheets

(51) Int. Cl.
*H04L 67/306* (2022.01)
*H04L 67/53* (2022.01)
*H04L 67/54* (2022.01)

(58) Field of Classification Search
USPC .............................. 709/220, 225, 227, 228
See application file for complete search history.

(56) References Cited

U.S. PATENT DOCUMENTS

| | | | | |
|---|---|---|---|---|
| 11,386,152 | B1* | 7/2022 | Arowesty | G06F 16/9536 |
| 11,710,102 | B2* | 7/2023 | DeLand | G06Q 10/1093 |
| | | | | 705/7.18 |
| 11,811,524 | B1* | 11/2023 | Mahadevan | H04L 67/306 |
| 2010/0122316 | A1* | 5/2010 | Lyon | G06F 21/34 |
| | | | | 726/1 |
| 2014/0278610 | A1* | 9/2014 | Carnahan | G06Q 10/02 |
| | | | | 705/5 |
| 2015/0006248 | A1* | 1/2015 | Li | G06Q 10/06395 |
| | | | | 705/7.31 |
| 2016/0034466 | A1* | 2/2016 | Sinha | G06F 16/9535 |
| | | | | 707/732 |
| 2017/0034112 | A1* | 2/2017 | Perlegos | H04W 4/21 |
| 2018/0063062 | A1* | 3/2018 | Burdakov | H04L 51/226 |
| 2018/0107795 | A1* | 4/2018 | Kapur | G06N 20/00 |
| 2018/0130092 | A1* | 5/2018 | Nahass | A63F 13/49 |
| 2019/0058745 | A1* | 2/2019 | Mocioiu | H04L 67/306 |
| 2020/0019912 | A1* | 1/2020 | Tilton | G06Q 10/06393 |
| 2021/0082044 | A1* | 3/2021 | Sliwka | H04L 9/3255 |
| 2021/0089963 | A1* | 3/2021 | Baek | H04L 67/535 |
| 2022/0058633 | A1* | 2/2022 | Yantis | G06Q 20/4016 |
| 2023/0117725 | A1* | 4/2023 | Quigley | G06Q 20/326 |
| | | | | 705/65 |
| 2023/0169610 | A1* | 6/2023 | Tesvich | G06Q 50/01 |
| | | | | 705/319 |

FOREIGN PATENT DOCUMENTS

| | | | | |
|---|---|---|---|---|
| CA | 2824627 | A1 * | 8/2012 | G06F 16/211 |
| EP | 3992877 | A1 * | 5/2022 | G06Q 10/10 |

* cited by examiner

METHODS AND SYSTEMS FOR USER DATA MANAGEMENT

CROSS-REFERENCE TO RELATED APPLICATIONS

This application is a continuation of U.S. patent application Ser. No. 18/297,606, entitled "METHODS AND SYSTEMS FOR USER DATA MANAGEMENT," and filed on Apr. 8, 2023, which is incorporated herein by reference.

BACKGROUND

Technical Field

The present disclosure generally relates to user data management, and more particularly, methods, systems, apparatuses, and non-transitory computer readable media for managing user data associated with online platforms.

Description of the Background

Modern-day digital interactions between consumer and businesses are largely based around a server-side platform that involves the business being responsible for authenticating consumers and managing consumer data. Utilizing a server-side platform offers certain advantages, such as being relatively straightforward to implement. Despite these drawbacks, the server-side platforms offer certain advantages. Another potential benefit is that, with a server-side platform, a business can track user interactions with the platform and use an interaction history to make more informed decisions about the user. As an example, the interaction history for a user may indicate that he or she can be trusted for receiving certain incentives or benefits for facilitating commerce with the user, such as extending credit or shipping certain high-value goods to the user. Server-side platforms where businesses are essentially custodians of users' data have become an accepted and ubiquitous paradigm in e-commerce.

Despite these advantages, a server-side paradigm introduces problematic issues for both consumers and businesses. For consumers, server-side platforms require relinquishing control of their data to the third-party business, which potentially reduce consumer privacy and allow for the possibility of the data being exposed (e.g., from a data breach) or of the consumers receiving unwanted communications (e.g., spam or phishing emails). For businesses, server-side platforms require the business to be responsible for handling and managing consumer data, which may raise operational costs and expose the business to significant regulatory overhead and liability.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Figure 1:
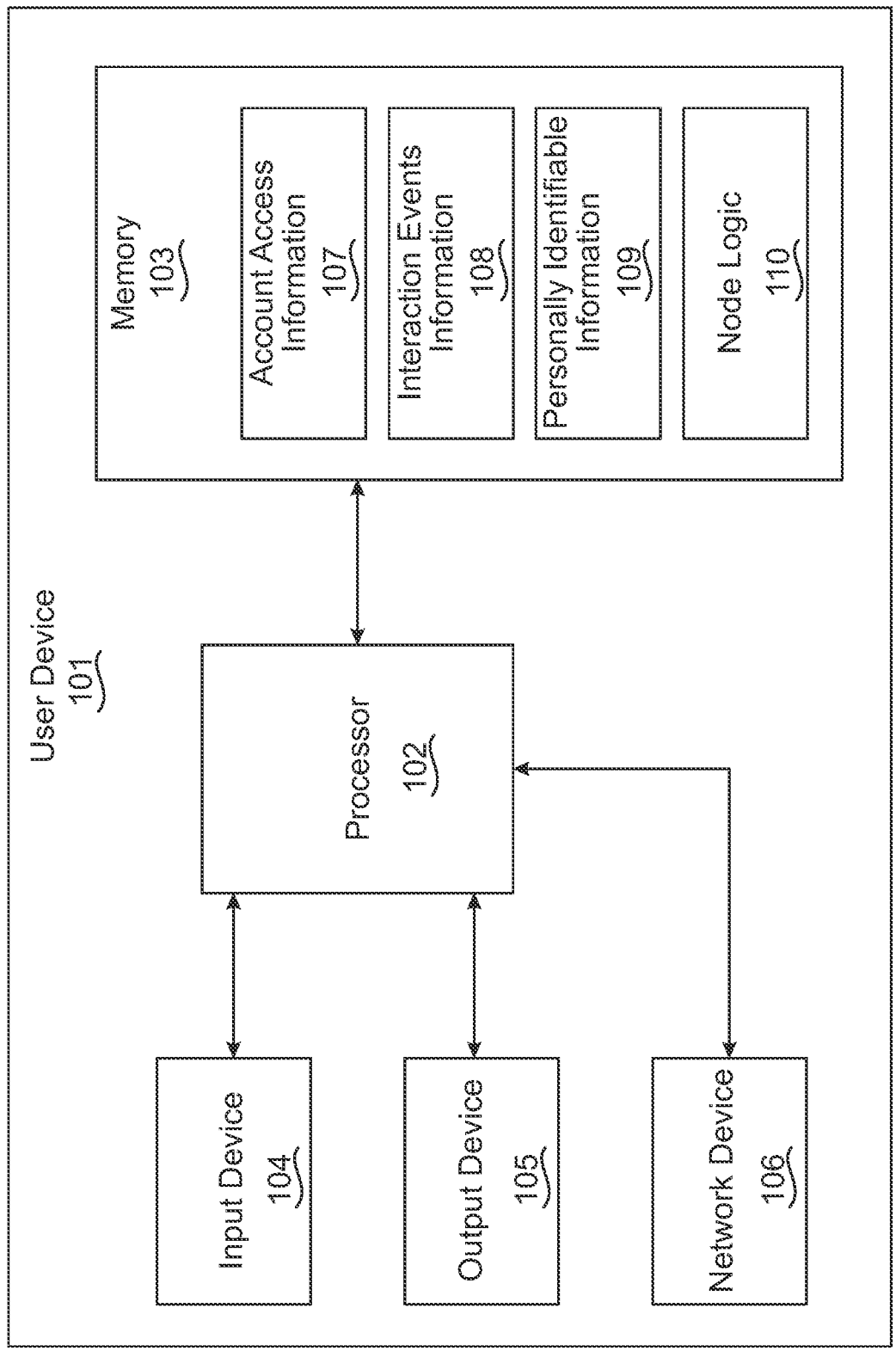
FIG. 1 is a block diagram of an exemplary embodiment of a user device.

The present disclosure generally pertains to systems and methods for user data management, so as to enable a user-device based authentication and data management system. These systems may be of use across a wide variety of online platforms that involve user accounts and the sharing of a user's personal information. By enabling a user's personal information to be stored on a user's device in a way that retains the benefits and convenience of the typical server-based storage, systems of the present disclosure may reduce the regulatory burden—and the associated expenses with complying with the regulations—of storing user data. By the same process, embodiments of the present disclosure may enhance user privacy by enabling users to more finely control what data they share for specific interactions with an online platform.

More precisely, systems of the present disclosure may employ a user device to store—in the device's on-board non-volatile memory—credentials or other information for accessing user accounts on various online platforms. The user device may also be used to store information recording instances of the user interacting with an online platform, including which of the stored user credentials were associated with the recorded interaction. If desired, multiple accounts may be maintained at the same online platform, and the login credentials for each of these accounts may utilize tokenized or non-tokenized data elements. Data from a web browser of a user device may be monitored to determine when the user begins interacting with an online platform. The user's interactions with the platform may then be monitored to generate data entries logging information about the specifics of the user's interaction with the platform. This information may be used by businesses to make decisions about the user, as described above for a paradigm involving server-side platforms. Thus, the system retains some of the benefits of server-side platforms while permitting user's to be the custodians of their own data permitting the user to decide what personal information is to be shared, as will be described in more detail below.

For a variety of reasons, many modern-day businesses create and maintain online platforms for consumers (also called users in this context) to engage. For modern-day online platforms, this engagement is often of an active variety, with users interacting with the platform (and the platform responding in some manner). This paradigm, some-times referred to as "Web 2.0," is contrasted with the paradigm of "Web 1.0," where users passively requested and consumed information from an online platform without having any effect on the contents of the platform itself. Two common ways that users actively engage with modern-day online platforms is to interact with other users (e.g., social media) and to purchase various goods and services (e.g., electronic commerce (e-commerce)).

Besides just involving active engagement, many modern-day online platforms involve (or at least allow for) repeat active engagement. In other words, many modern-day online platforms are structured with the intent that a user will interact with the platform across multiple, temporally-separated occasions, rather than a single, one-off instance. To facilitate this repeat interaction, many online platforms involve the concept of a "user account."

For most modern-day online platforms involving active user engagement, the concept of a "user account" is employed as part of the overall architecture of the online platform enabling that active engagement. In its simplest form, a user account is a set of data used by a computer system to represent an external agent (i.e., a human user). Typically, a user account is associated with a string of data uniquely identifying the user account (e.g., a username) and a set of data used to determine if an attempt to use the account is authorized (e.g., a password). Online platforms typically employ user accounts by having a user log into a user account to perform various actions on the online platform, with those actions subsequently able to be attributed to the user account.

A benefit of employing user accounts is that they allow an online platform to be customized to particular users. For example, user accounts may allow a user to change various configuration settings of the online platform to their preferences. As another example, it may allow a user to store commonly needed information with the online platform (e.g., financial information and shipping address for purchasing physical goods from online retailers). It may also allow a user to give an online platform the user's contact information (e.g., email address, phone number, etc.) to facilitate communications with the online platform. In many cases, these and other particular uses of the data associated with a user's user account may significantly increase the convenience and utility of the online platform to users.

Unfortunately, this approach also reduces user privacy and increases the risk of user data being exposed to unauthorized third parties (e.g., through data breaches of an online platform). In this regard, sensitive user data is stored on servers for which the users have no control. This lack of control means a user must generally rely on the online platform to ensure the user's data is properly secured and is not being use in some undisclosed way (e.g., being shared to third parties or used for unwanted solicitations). This leaves users vulnerable to the possibility that the data on these servers can be compromised by security vulnerabilities. It also may leave users vulnerable to the possibility that the business controlling the online platform will mine the data to determine information about the user and his or her habits or to make unwanted solicitations to the users. The retention of data by the online platform may also be problematic for the online platform, since it subjects the online platform to various regulatory burdens regarding data collection and storage.

To better address these issues, embodiments of the present disclosure may employ a user device to store—in the device's on-board non-volatile memory—credentials or other information for accessing user accounts on various online platforms. The user device may also be used to store information recording instances of a user interacting with an online platform. The user is provided with control over what information is shared with an online server, including information about past interactions of the user with the online server or with other third-party servers. Thus, the user is effectively the custodian of his or her own data.

FIG. 1 shows a diagram of an exemplary user device 101 in accordance with an exemplary embodiment of the present disclosure. The user device 101 comprises at least one processor 102 that is connected to an input device 104, an output device 105, and a memory 103. The input device 104 may be a touchscreen capable of registering the location of a user's fingers on the touchscreen using for example capacitive sensing. In other embodiments, other types of input devices 104 may be used, such as a keypad, for example. The processor 102 may be capable of interacting with the input device 104 to receive data from the user. The output device 105 may be capable of communicating information to a user through some mechanism, such as a digital screen. In some embodiments, the input device 104 and the output device 105 may be integrated together and share hardware resources, such as when a touchscreen is used. The processor 102 may be capable of interacting with the output device 105 to transmit data to the user. In a similar manner, the processor 102 may be capable of interacting with the network device 106 to communicate, directly or indirectly, with other devices. In particular, the processor 102 may be capable of interacting with the network device 106 to communicate with other devices over the internet, such as one or more servers hosting an online platform.

The memory 103 may be a memory device capable of storing digital data. The processor 102 can retrieve data stored in the memory 103 to perform various operations using this data. In the exemplary embodiment shown by FIG. 1, part of the data stored within the memory 103 is an account access information 107, which contains data about the information used to access user accounts on various online platforms. Also part of the data stored within the memory 103 is an interaction events information 108, which contains data about a user's interactions with various online platforms (i.e., about one or more interaction events). Additionally, part of the data stored within the memory 103 is personally identifiable information 109, which contains data that personally identifies a user. Personally identifiable information 109 can be used by a user when interacting with an online platform, for example, when a user is creating an account with an online platform or making a purchase using an online platform. Additionally, in the exemplary embodiment shown in FIG. 1, part of the information stored in the memory 103 includes node logic 110. The node logic 110 may generally include data and instructions for carrying out the operation of the user device 101 described in the following paragraphs, portions of which are described in more detail in FIGS. 3, 5, 6, and 7.

In operation, the processor 102 may act so as to monitor the activity of a user with regards to the user device 101. The processor 102 may use the monitored activity to determine when the user is interacting with an online platform. When the processor 102 detects that a user is interacting with an online platform, it may utilize the monitored activity to generate and store one or more logs of information about the user's interaction with the platform in interaction events information 108. Additionally, the processor 102 may also utilize the monitored activity to determine a current goal of the user with respect to the online platform. Depending on the goal determined, the processor 102 may utilize the information stored in the memory 103 and/or may generate tokenized information to automatically provide certain information to the online platform. Examples of such information include login information and personal information, such as an email address, mailing address, and phone number.

From the user's perspective, this ability allows him or her to control what personal information the online platform is given. In particular, because a user can choose whether to share his or her true personal information or whether to share tokenized personal information—which may either be previously used or newly generated—the user may control what true personal information the online platform knows about the user and the transactions and/or other interactions by the user with the online platform. It may also allow contact information to be made specific to the online platform, safeguarding the user's true contact information from being leaked or used for other purposes.

Note that the node logic 110 can be implemented in software, hardware, firmware or any combination thereof. In the exemplary user device 101 illustrated by FIG. 1, the node logic 110 is implemented in software and stored in memory 103. As an example, the node logic 110 may be an application or "app" stored on the user device 101. When implemented in software, the node logic 110 can be stored and transported on any computer-readable medium for use by or in connection with an instruction execution apparatus that can fetch and execute instructions, such as the processor 102. In the context of this document, a "computer-readable medium" can be any means that can contain or store a computer program for use by or in connection with an instruction execution apparatus.

Figure 2:
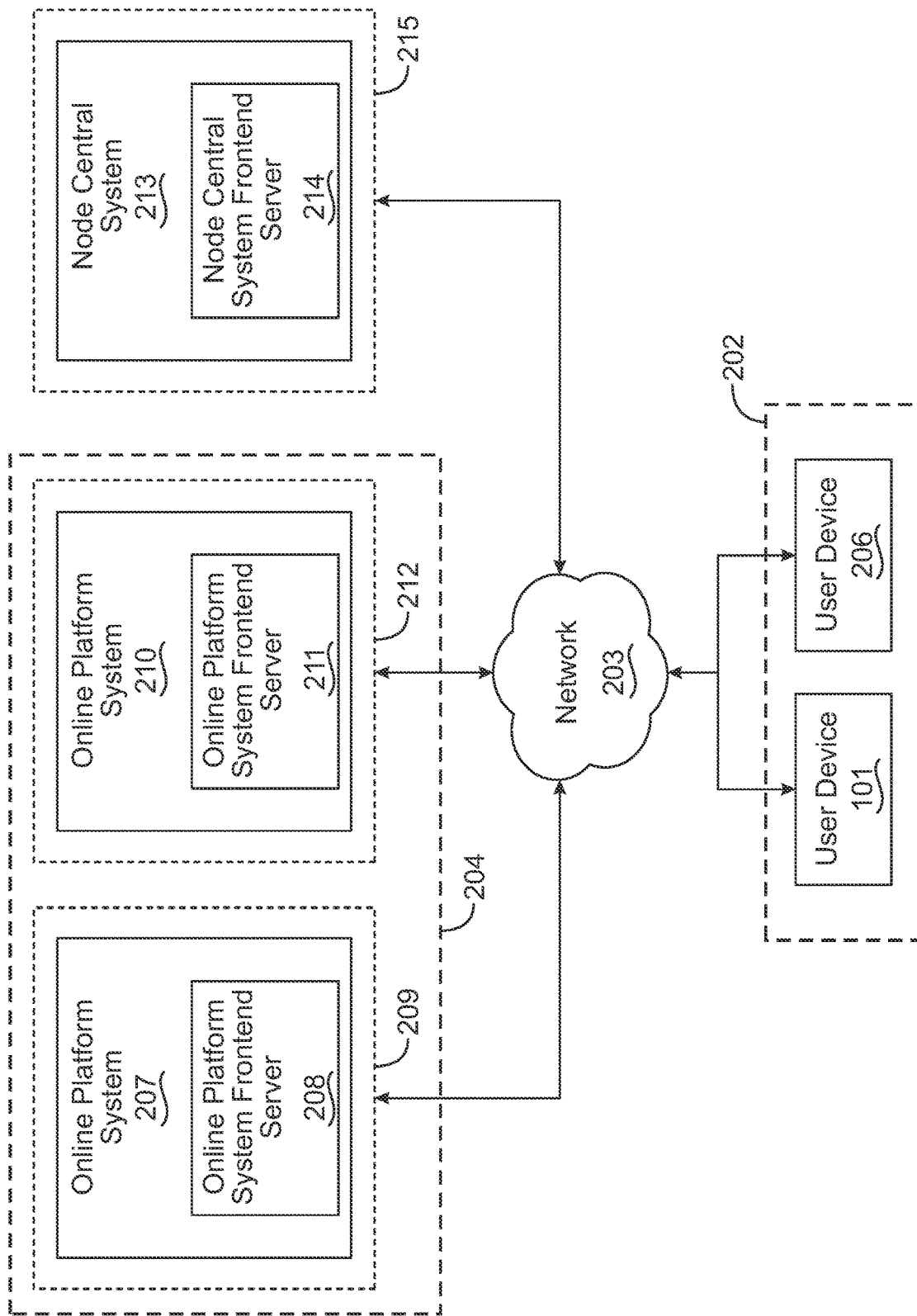
FIG. 2 is a block diagram of an exemplary online platform environment.

FIG. 2 is a block diagram of an exemplary online platform environment. The online platform environment can include user devices 202, online platform systems 204, and node central system 213 communicating over a network 203. In some examples, a user may have more than one user device with which he or she can interact with the online platform. As shown in FIG. 2, a user can be associated with user device 101, as previously described with respect to FIG. 1, and user device 206, which may include similar components and have similar functionality as described with respect to user device 101. Although FIG. 2 shows two user devices 202, it should be understood that a user may interact with online platform using any number of user devices associated with the user. User devices 202 can be used by a user to monitor a user's activity with respect to one of online platform systems 204, and/or to provide information to one of online platforms systems 204, such as account access information 107, interaction events information 108, and/or personally identifiable information 109. It should be understood that in some embodiments, a user operating user device 101 and/or user device 202 may not be required to register with a centralized server with a username and/or password in order to use the user devices 202 to facilitate communications with online platforms.

FIG. 2 depicts online platform systems 204 including an online platform system 207 and an online platform system 210. It should be understood that although FIG. 2 shows two online platform systems (e.g., online platform system 207 and online platform system 210) within the online platform environment, there may be any number of online platform systems 204 within the online platform environment. Online platform systems 204 can each be implemented as one or more servers.

Online platform system 207 can include an online platform system frontend server 208. Each user device 202 can be configured to communicate with online platform system 207 via online platform system frontend server 208 in order to transmit and receive data from online platform system 207, such as when providing account access information 107, interaction events information 108, and/or personally identifiable information 109, and when monitoring a user's activity with respect to online platform system 207. Similarly, each user device 202 can be configured to communicate with online platform system 210 via online platform system frontend server 211 in order to transmit and receive data from online platform system 210. It should be understood that online platform system 207 can be associated with entity 209, which can be a company or organization that offers products and/or services via online platform system 207. Similarly, online platform system 210 can be associated with entity 212, which can be a company or organization that offers products and/or services via online platform 210.

Node central system 213 can be a single server, or in some embodiments, can be implemented as more than one server. In any case, node central system 213 can include node central system frontend server 214 that is configured to communicate with both online platform systems 204 (e.g., via online platform system frontend servers 208, 209) and user devices 202. By interacting with node central system frontend server 214, user devices 202 can send and receive data (e.g., transaction information) associated with interactions with online platform systems 204. In some embodiments, node central system 213 can communicate with online platform system 204 (e.g., via node central system frontend server 214) to receive and transmit data. In some embodiments, node central system 213 can be configured to store transaction data associated with a user's interactions with online platform systems 204. It should be understood that node central system 213, in some embodiments, can be configured to have some or all of the functionality as described with respect to user device 101 (and more particularly node logic 110).

In some embodiments, data stored on node central system 213 can be used to ascertain a level of trust for the user. For example, when a user interacts with a respective online platform system (e.g., online platform system 207) by logging in, placing an order, etc., node central system 213 may provide transaction information to the respective online platform system, thereby allowing online platform system to ascertain a level of trust for the user. For example, if the transaction information indicates that the user has engaged in many transactions with the online platform, then the platform may assign a higher level of trust to the user, which may affect decisions about the user such as whether to extend credit, offer discounts, or ship products to the user. Thus, node central system 213 can provide the online platform with sufficient transaction information to make various decisions about the user to achieve benefits similar to conventional server-side platforms. However, such benefits are realized without requiring the platform to be the custodian of the user's data, which instead may be stored and maintained on the user device 101.

Note that, in some embodiments, the user device 101 (or, more particularly, the node logic 110) may have different levels of integration between different online platforms. As used here, "integration" refers to whether and to what extent an online platform system is adapted to or otherwise engineered for use with the node logic 110 or with the node central system 213 (e.g., by integrating code designed to work with the node logic 110). These different levels of integration may affect the manner in which the user device 101 records interaction event information 108 or provides transaction information to the online platform. For instance, in some embodiments the online platform being interacted with may not have any integration with the node logic 110. In this circumstance, the node logic 110 may operate by acquiring and directly analyzing the source code of a webpage the user is currently interacting with. As another example, in some embodiments the online platform may have some integration with the node logic 110. In this circumstance, the node logic 110 may operate by directly acquiring, from information sent by the online platform for use by the node logic 110, information about the interaction event.

In general, an online platform may have greater and lesser degrees of integration with the node logic 110. These differing levels of integration may affect what information the node logic 110 acquires directly from the online platform and which information it acquires indirectly, such as by analyzing the source code of a webpage. The differing levels of integration may also affect what information the node logic 110 allows a user to directly transmit to a given online platform.

Also note that, broadly speaking, an online platform's willingness to use information provided by the user device 101 to determine a level of trust for the user (e.g., a trust score or interaction event information) significantly depends on the online platform's belief that the information provided by the user device 101 is authentic (i.e., genuine and untampered with). To this end, an online platform's willingness to utilize the information as a factor in its trust for a given user may depend on the online platform's trust in the robustness and security of the node logic 110 and the node central system 213 in ensuring the authenticity of the provided information. To this end, online platforms having greater integration with the node logic 110 or with the node central system 213 may have a greater trust reliability of the node logic 110 or with the node central system 213 in ensuring the integrity of provided trust information. Consequently, online platforms having greater integration with the node logic 110 or with the node central system 213 may place a greater reliance on the provided information in determine the degree of trust the online platform has with respect to the user.

Figure 3:
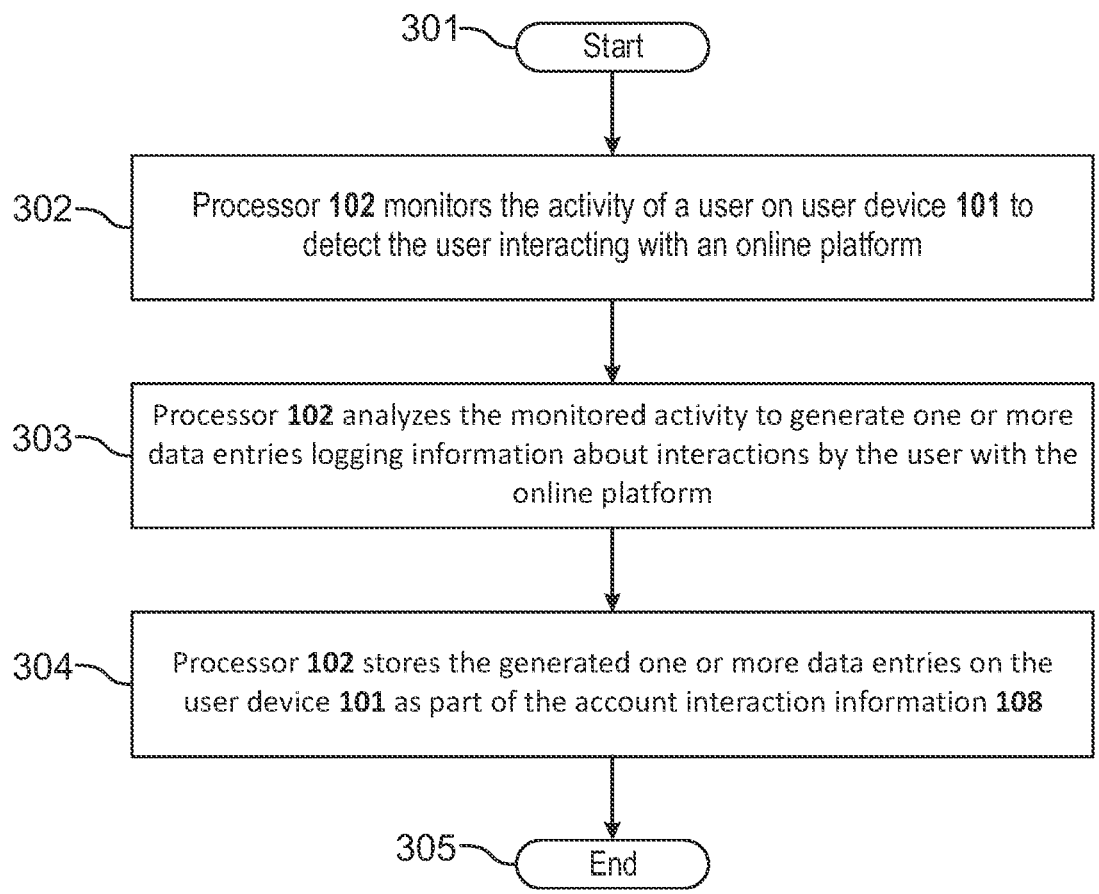
FIG. 3 is a flowchart of an exemplary method of user authentication and data management.

FIG. 3 is a flowchart illustrating a process of authenticating a user to an online platform as just described. To start, as shown by block 302 of FIG. 3, the processor 102 may monitor the activity of a user on the user device 101 to detect the user interacting with an online platform. The activity of the user may include input received directly from the user (e.g., from the input device 104) and may include information about the current application on the user device 101 with which the user is interacting. For example, in some embodiments, the processor 102 may monitor a user's activity in a web browser to determine the current uniform resource locator (URL) (colloquially referred to as "web address") of the web resource (e.g., a web page) on the web browser. As another example, in some embodiments the processor 102 may monitor a user's activity in a (non-web browser) application (app). The processor 102 may use information about the app—such as its name—to determine that the app is associated with an online platform.

After the monitored activity indicates that the user is interacting with an online platform, as shown by block 303 of FIG. 3, the processor 102 may analyze the monitored activity to generate one or more data entries logging information about interactions by the user with the online platform. For example, in some embodiments, a user may be interacting with an online platform through a web browser of the processor. The processor 102 may monitor the activity of the user to determine information about the user's interaction with the online platform. For example, the processor 102 may log every instance a user logs in to a particular online platform (e.g., with a timestamp). As another example, the processor 102 may log every instance a user makes a purchase on an online platform and/or completes a transaction (i.e., purchases a good or service) with the online platform.

After generating one or more data entries logging information about the user's interaction with the online platform, as shown by block 304 of FIG. 3, the processor 102 may store the generated data entries on the user device 101 as part of the interaction events information 108. This stored information may be used for a variety of purposes, as described in more detail below. For example, in some embodiments the user may see logged data entries grouped into various categories. One category in which the logged data entries may be grouped is by the online platform associated with the logged data entry. Another category in which the logged data entries may be grouped is by the time range (e.g., by day, week or month) in which the logged data entry occurred.

Additionally, in the course of monitoring the user's activity with the online platform, the processor 102 may also determine information about a current goal of the user. Specifically, the processor 102 may analyze the monitored user activity to determine information about a current goal of the user with respect to the online platform. In particular, the processor 102 may determine if the current goal of the user is likely to be one of several enumerated categories of goals. For example, relevant goals may include if the user is attempting to log into an account of the online platform, if the user is attempting to create a new account with the online platform, and if the user is attempting to provide personal information to the online platform.

The processor 102 may utilize a variety of methods to determine the current goal of the user from the monitored user activity. For example, in some embodiments the processor 102 may, as part of the monitored user activity, acquire the source code of a webpage the user is currently interacting with (e.g., the code associated with generating a webpage (of an online platform) in the web browser, such as HyperText Markup Language (HTML) files and/or JavaScript files). The processor 102 may analyze this code to associate certain fields of the webpage with certain user goals. For example, the processor 102 may associate fields having a name containing the word "username" or "password" with logging in to the website. The processor 102 may monitor the user activity to detect when the user interacts with one of these fields and, based on this interaction, determine the user's current goal is logging into the website.

After determining information about the current goal of the user for the online platform, the processor 102 may generate new entries or utilizes existing entries in the account access information 107, the interaction events information 108, or the personally identifiable information 109 to automatically provide information to the online platform. As described in more detail below in FIGS. 5, 6, and 7, the specific actions of the processor 102 may vary depending on the (determined) current goal of the user.

Figure 4:
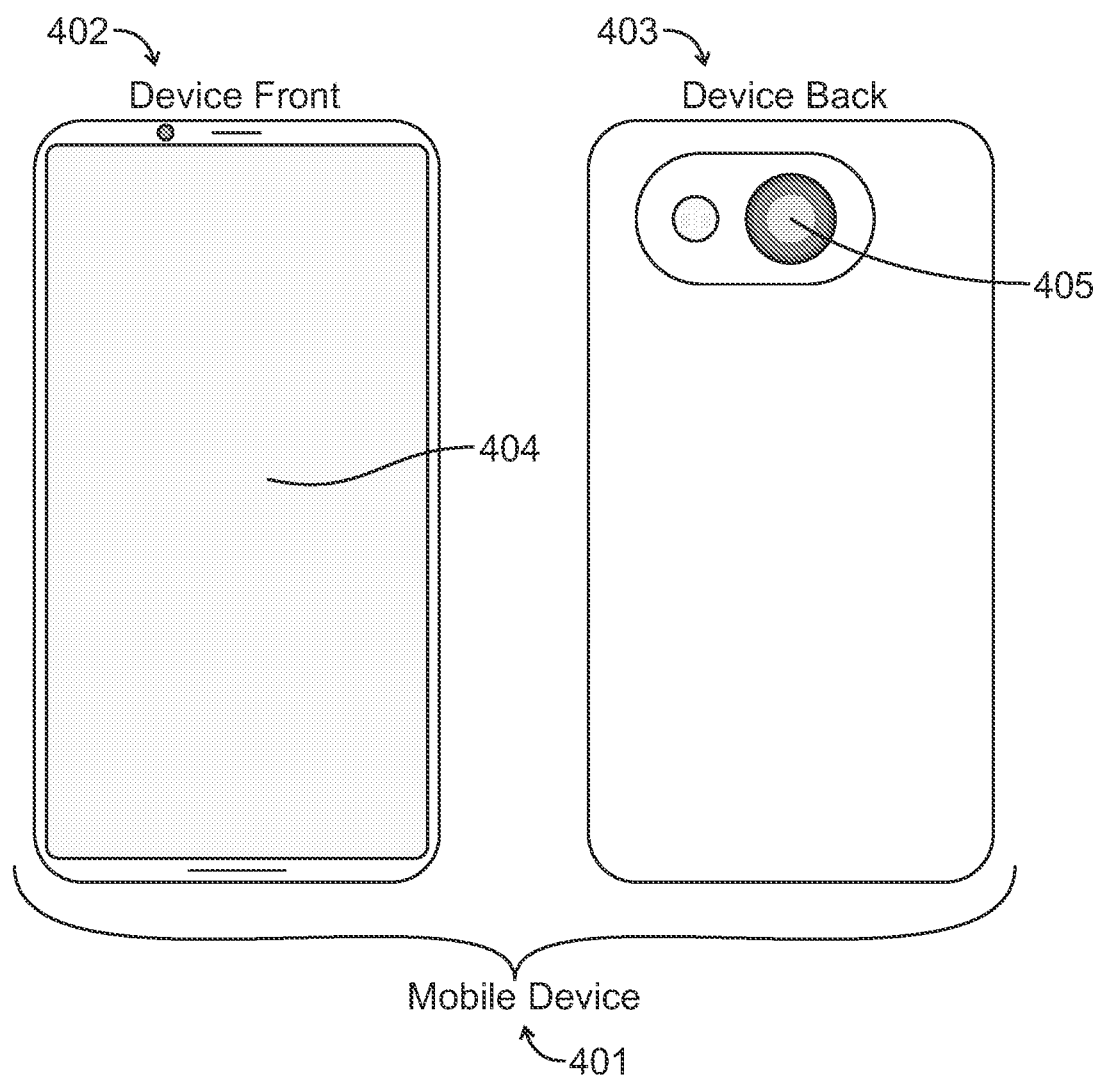
FIG. 4 is an illustration of an exemplary user device based on a smartphone.

FIG. 4 is an illustration of an exemplary mobile device having a digital screen as just described. Specifically, FIG. 4 shows a typical smartphone 401 possessing a touch screen 404 on one side and a camera 405 on an opposite side. The touch screen 404 covers much of the device's front side 402 and implements the input device 104 and output device 105 of FIG. 1. The touch screen 404 is capable of giving output by displaying images (and video, by adjusting the images quickly enough), which it can accomplish by controlling the output of a grid of pixels. The touch screen 404 is also capable of receiving user input in the form of taps, gestures, and other physical interactions with the screen. The camera 405, on the other hand, is located on the upper portion of the device's back side 403. The camera 405 is capable of capturing images it can "see," by capturing the intensity and color of visible light striking the image sensor 405. Not shown are the processor and memory internal to the smartphone 401 but which function similarly to the processor 102 and the memory 103 of FIG. 1.

Figure 5:
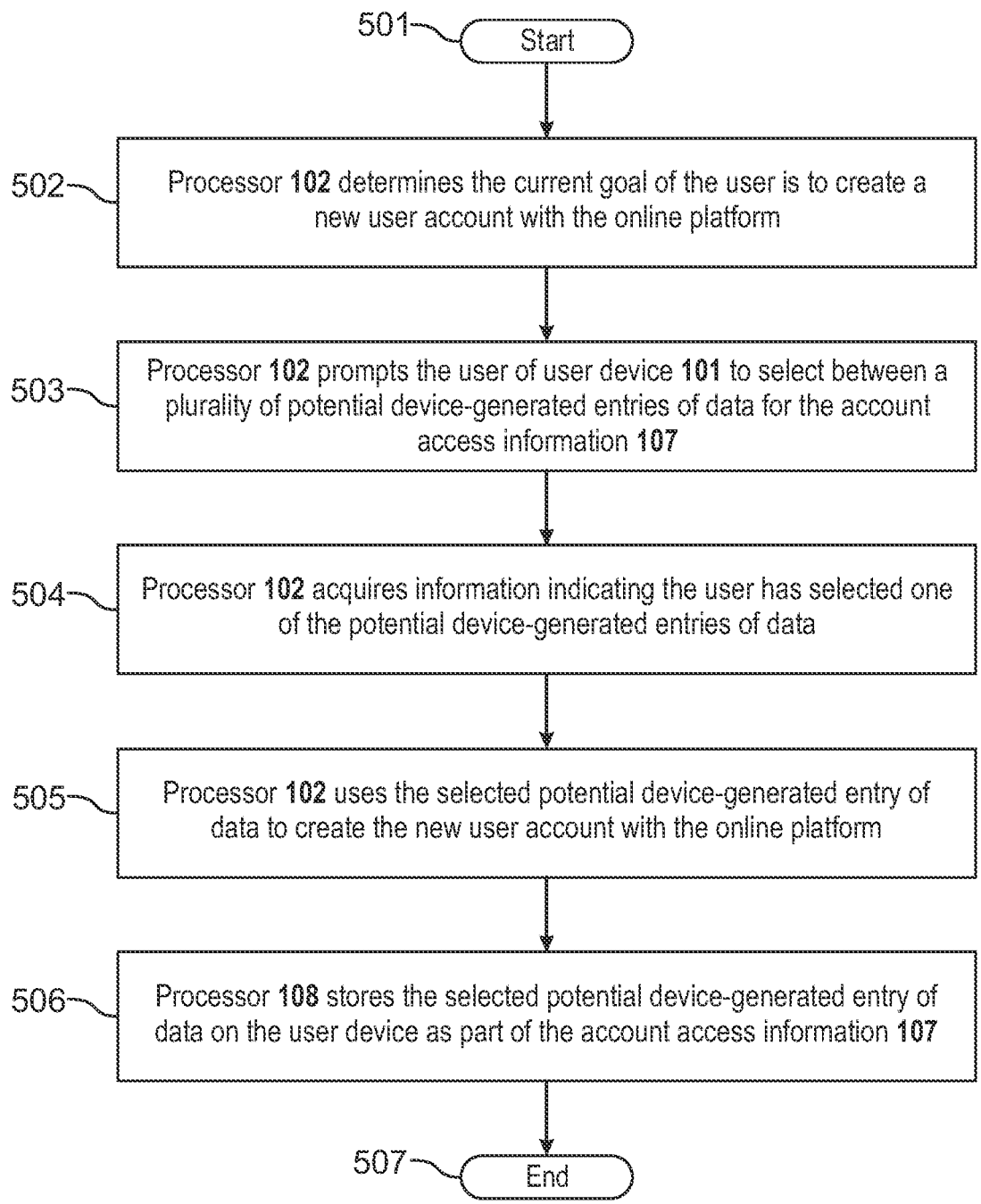
FIG. 5 is a flowchart of an exemplary method of creating a new user account.

FIG. 5 is a flowchart illustrating a process of responding to a user goal of creating a new online account. To start, as shown by block 502 of FIG. 5, the processor 102 may determine the current goal of the user is to create a new user account with the online platform. In some embodiments, this may involve a plugin of a web browser running on the user device 101 detecting that the user has brought into focus an element of the current web page of the browser that is involved with entering user credentials to log in to an account.

After the monitored activity indicates the user's current goal is creating a new user account with the online platform, as shown by block 503 of FIG. 5, the processor 102 may prompt the user to select between a plurality of potential device-generated entries of data for the account access information 107. Broadly speaking, the plurality of potential device-generated entries of data each include information requested by the online platform to create a new account, possibly along with associated metadata. For example, an online platform may request—as part of the account creation process—a username to be used to identify the new account and a password to be used to authenticate an attempt to log in to the new account. In this context, one of the device-generated entries of data may comprise a device-generated account identification element (e.g., a device-generated username) and a device-generated account authentication element (e.g., a device-generated password). The device-generated entry of data may also contain metadata such as the domain name associated with the device-generated entry of data.

Additionally, some online platforms may request—again as part of the account creation process—an email address which may be used to contact the user. In this context, one of the device-generated entries of data may comprise a (suggested) device-generated tokenized email address. For some online platforms, the requested email address may also be used as the username for the new account. For these online platforms, the device-generated account identification element may a device-generated tokenized email address.

After prompting the user to select between the plurality of potential device-generated entries of data, as shown by block 504 of FIG. 5, the processor 102 may acquire information indicating the user has selected one of the potential device-generated entries of data.

After receiving information about the user's selected potential device-generated entry of data, as shown by block 505 of FIG. 5, the processor 102 may use the selected potential device-generated entry of data to create the new user account with the online platform.

After creating the new user account with the online platform, as shown by block 506 of FIG. 5, the processor 102 may store the selected potential device-generated entry of data on the user device as part of the account access information 107.

Figure 6:
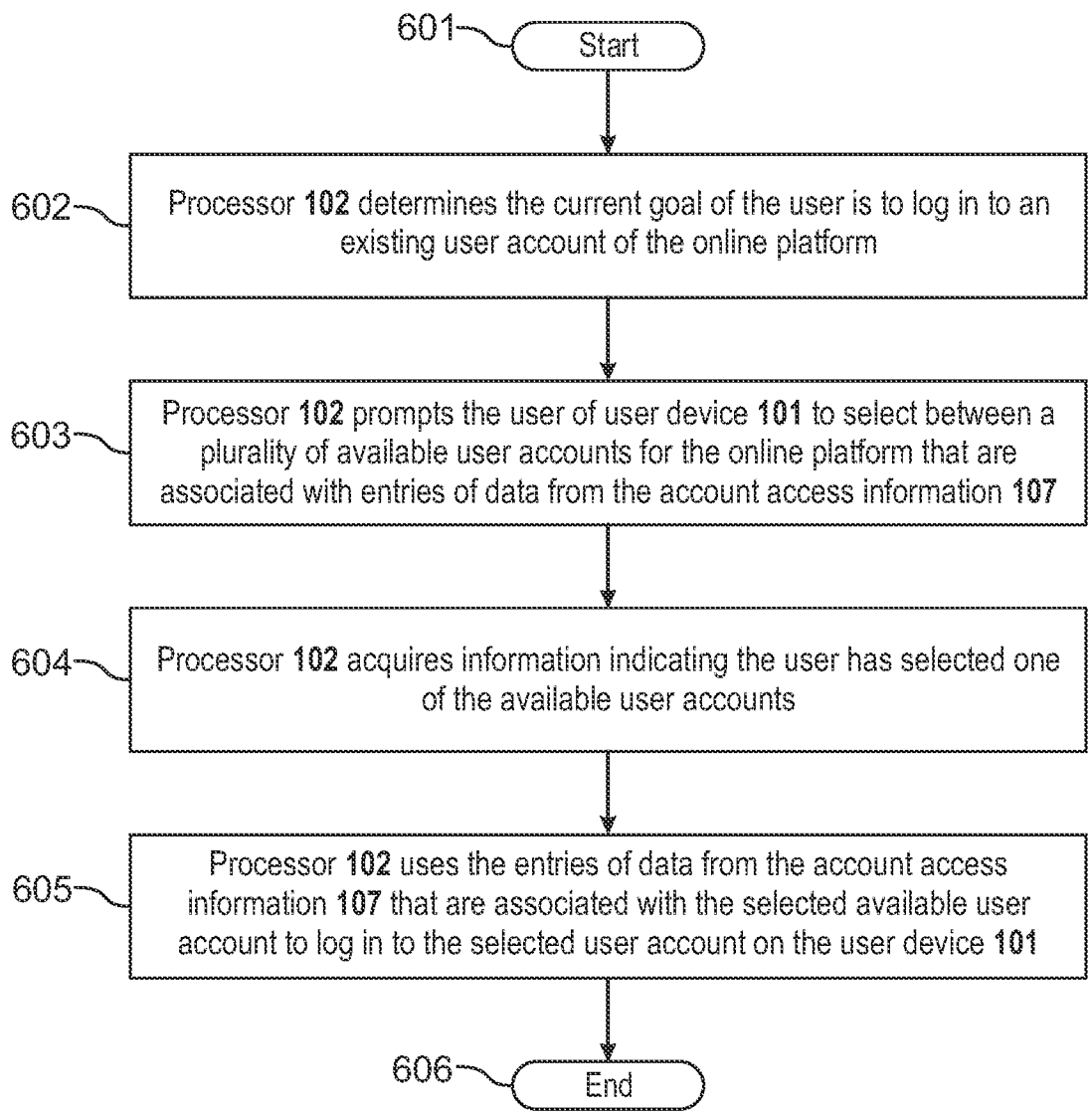
FIG. 6 is a flowchart of an exemplary method of logging in to an existing user account.

FIG. 6 is a flowchart illustrating a process of responding to a user goal of logging in to an existing online account. To start, as shown by block 602 of FIG. 6, the processor 102 may determine the current goal of the user is to log in to an existing user account of the online platform.

After the monitored activity indicates the user's current goal is to log in to an existing online account of the online platform, as shown by block 603 of FIG. 6, the processor 102 may prompt the user to select between a plurality of available user accounts for the online platform that are associated with entries of data from the account access information 107. Broadly speaking, a user may utilize multiple accounts with a single online platform so as to control the ability of the online platform to associate a user's activity with the user's identity or to the user's previous activity on the online platform. For example, a user may maintain two online accounts with an online platform, one that is associated with the user's real name, address, and other personal information and one that is associated with a tokenized (false) name, address, and other personal information. The user, when attempting to log in to the associated online platform, may select between the two accounts based on whether the user desires the online platform to associate the user's planned activity—such as the purchase of certain goods or services—with the user's real identity.

After prompting the user to select between the plurality of available user accounts, as shown by block 604 of FIG. 6, the processor 102 may acquire information indicating the user has selected one of the available user accounts.

After receiving information about the user's selected available user account, as shown by block 605 of FIG. 6, the processor 102 may use the entries of data from the account access information 107 that are associated with the selected available user account to log in to the selected user account on the user device 101. For example, the selected entry of data may comprise a username of an account with the online platform and a password used to authenticate an attempt to access the account identified by that username.

Figure 7:
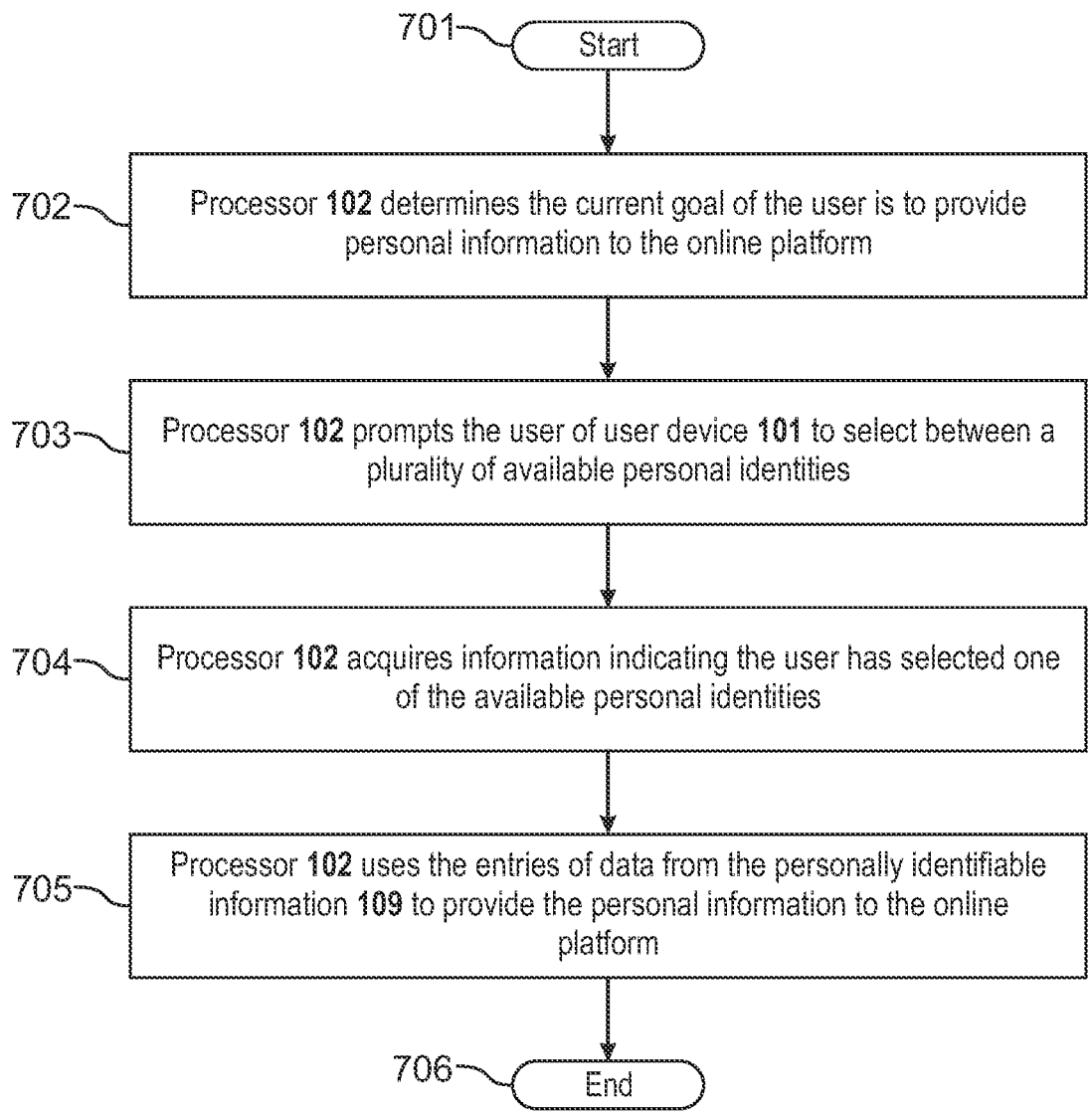
FIG. 7 is a flowchart of an exemplary method of providing personal information.

FIG. 7 is a flowchart illustrating a process of responding to a user goal of providing personal information. To start, as shown by block 702 of FIG. 7, the processor 102 may determine the current goal of the user is to provider personal information to the online platform.

After the monitored activity indicates the user's current goal is to provide personal information to the online platform, as shown by block 703 of FIG. 7, the processor 102 may prompt the user to select between a plurality of available personal identities. For example, a personal identity may comprise a variety of information about the user collectively referred to as personally identifiable information. Examples of personally identifiable information include name (e.g., first name, middle name, and last name), email address, phone number, and shipping address. A personal identity may comprise data for some (or all) of these categories. For example, one personal identity may comprise a particular first and last name, a particular email address, and a particular phone number. In general, personal identities may utilize the same data for certain categories, such that, for example, two or more personal identities may utilize the same name or may utilize the same shipping address.

In some embodiments the user may have at least two personal identities. One personal identity, referred to as the user's true personal identity, is comprised of true data about the user. In other words, the true personal identity is comprised of the user's true first and last name, true phone number, and true shipping address. Another personal identity, referred to as a tokenized personal identity, is comprised of at least some tokenized (e.g., false) data about the user. For a tokenized personal identity that uses only tokenized personally identifiable information, the tokenized personal identity may comprise a tokenized name, a tokenized email address, a tokenized phone number, and a tokenized shipping address. Note that, in general, a user may have more than one tokenized personal identity, including more than one completely tokenized personal identities that do not share any common personally identifiable information.

Also note that, in general, a tokenized personal identity may comprise a mixture of tokenized personally identifiable information and true personally identifiable information. One example where a user may desire to use such a mixed tokenized user identity is for the purchase of physical goods that will be shipped to the user's address. The user may desire to provide his or her true address to the online platform so that he or she can receive the purchased goods while simultaneously desiring not to provide true first and last name, phone number, and email address.

After prompting the user to select between the plurality of available personal identities, as shown by block 704 of FIG. 7, the processor 102 may acquire information indicating the user has selected one of the available personal identities.

After receiving information about the user's selected personal identity, as shown by block 705 of FIG. 7, the processor 102 may use the entries of data from the personally identifiable information 109 to provide the personal information to the online platform.

Figure 8A:
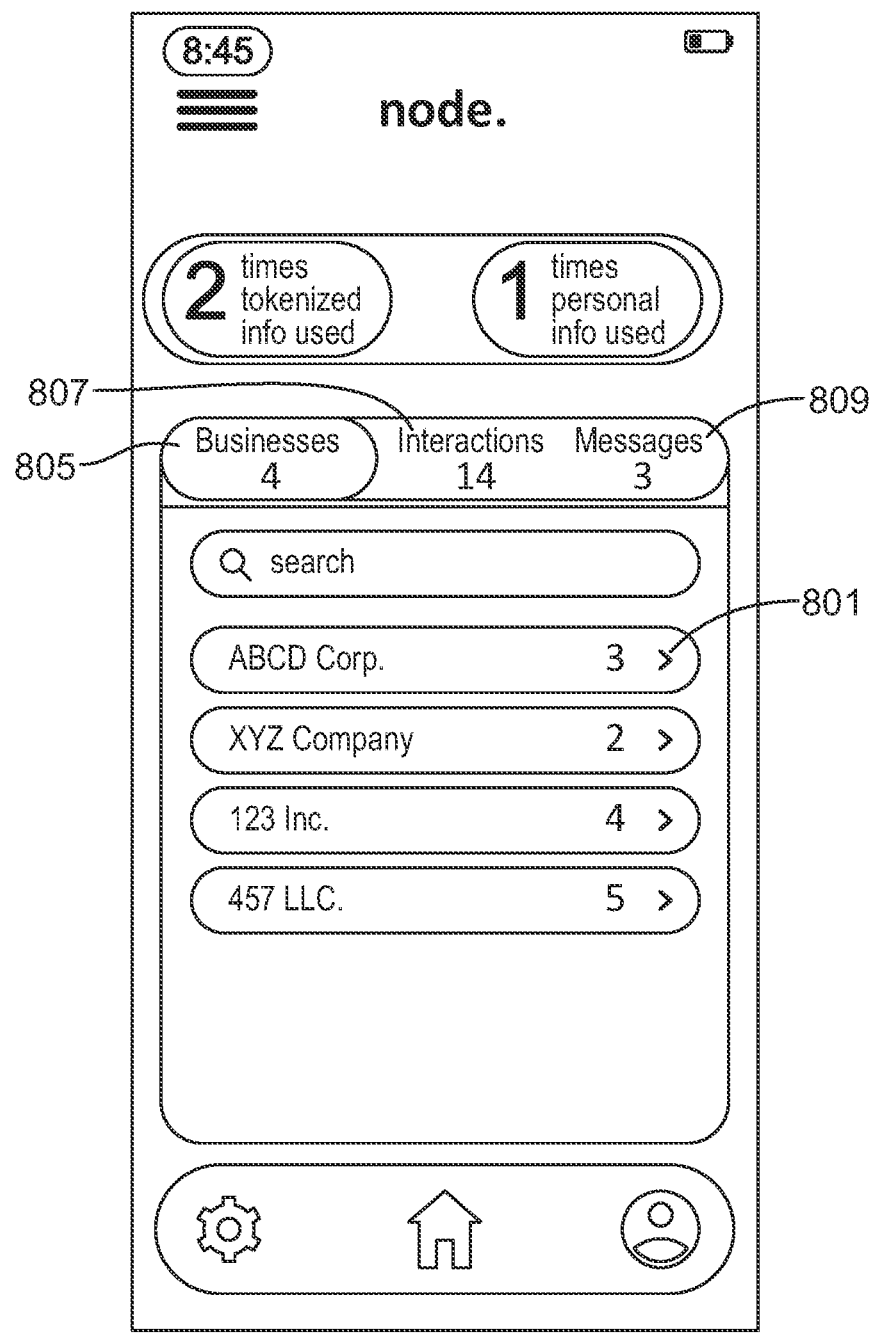
FIGS. 8A, 8B, 8C, and 8D are illustrations of exemplary graphical user interfaces (GUIs) for displaying stored interaction events.
Figure 8B:
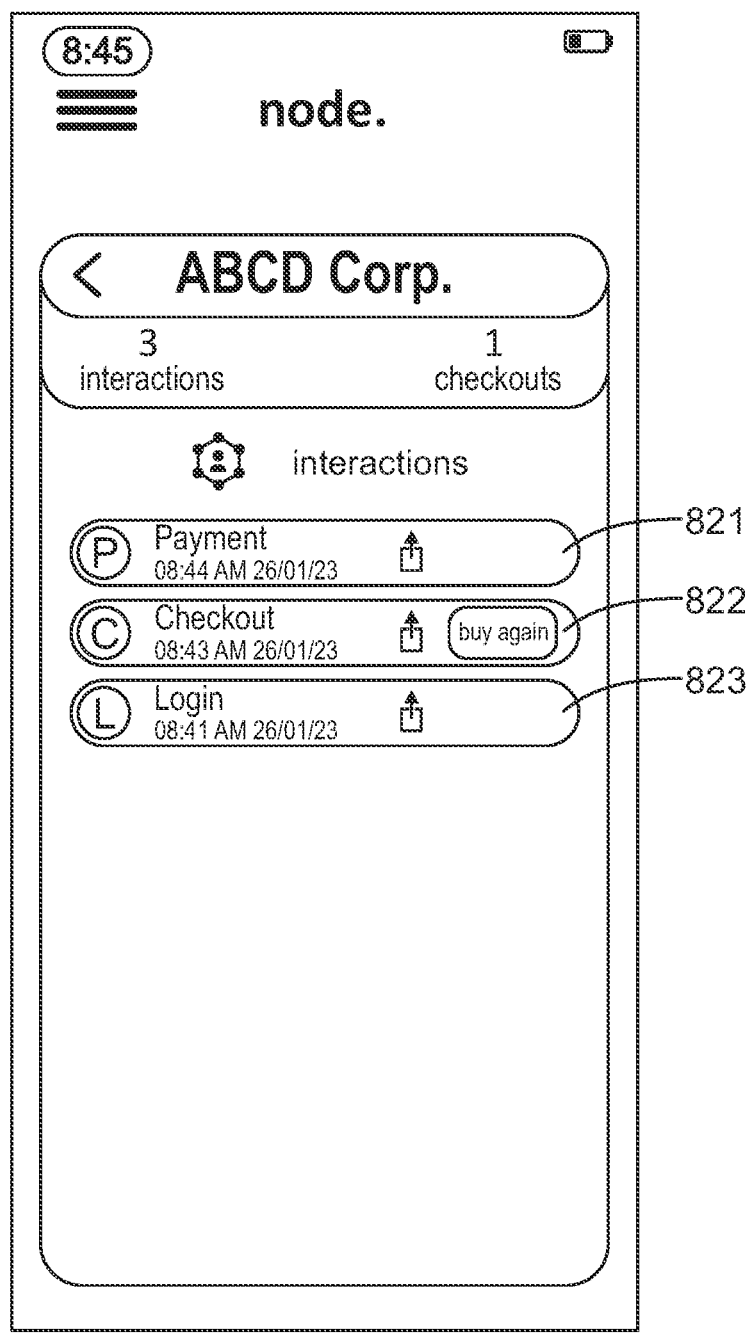
Figure 8C:
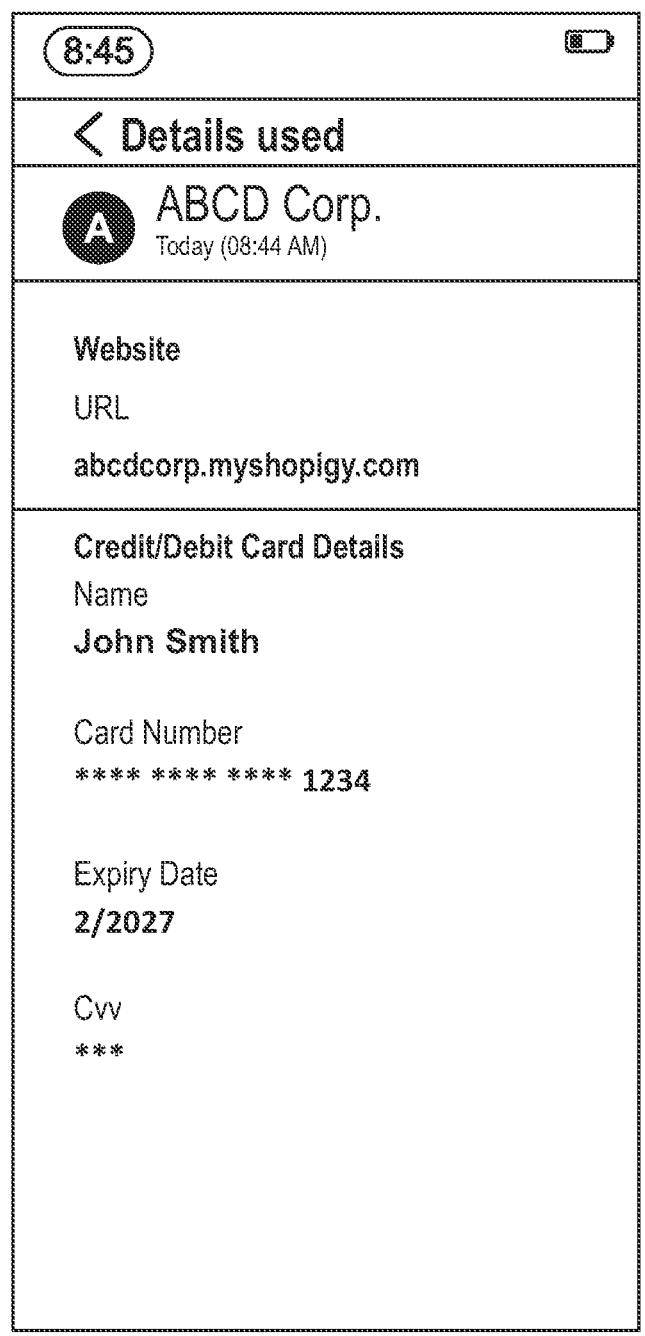
Figure 8D:
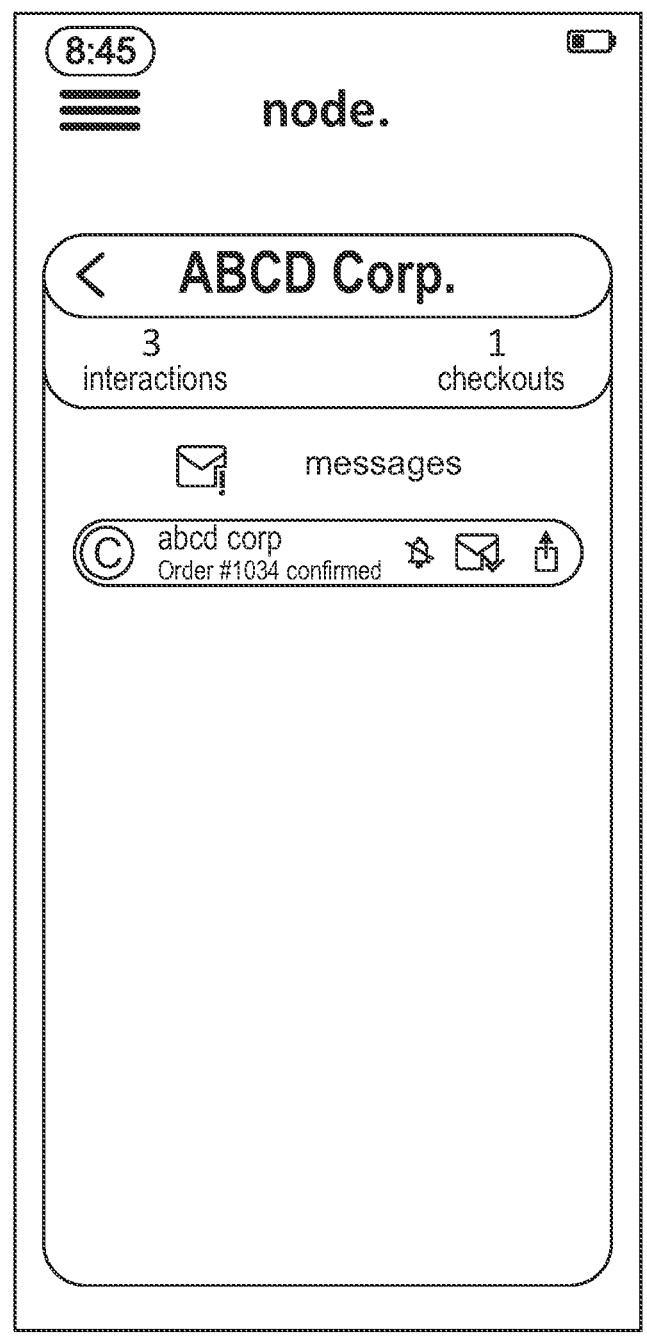

FIGS. 8A, 8B, 8C, and 8D are illustrations of exemplary graphical user interfaces (GUIs) for displaying various stored interaction events information. As shown by the figures, a variety of types of interaction events information may be stored. In particular, FIG. 8A shows how interaction events information 108 may be grouped by associated online platform. FIG. 8B shows some of the types of interaction events information that may be logged, such as instances of the user logging in to an online platform, instances of the user making a purchase with an online platform, and instances of the user paying for a purchase with an online platform. As shown by FIG. 8C, each logged instance of user interaction may contain a variety of information about the interaction. In particular, FIG. 8C illustrates how each interaction may contain information about the type of interaction, the associated online platform, information about the specific access to the online platform, and a timestamp of when the interaction occurred. FIG. 8D illustrates how messages from the online platform may also be displayed.

Figure 11A:
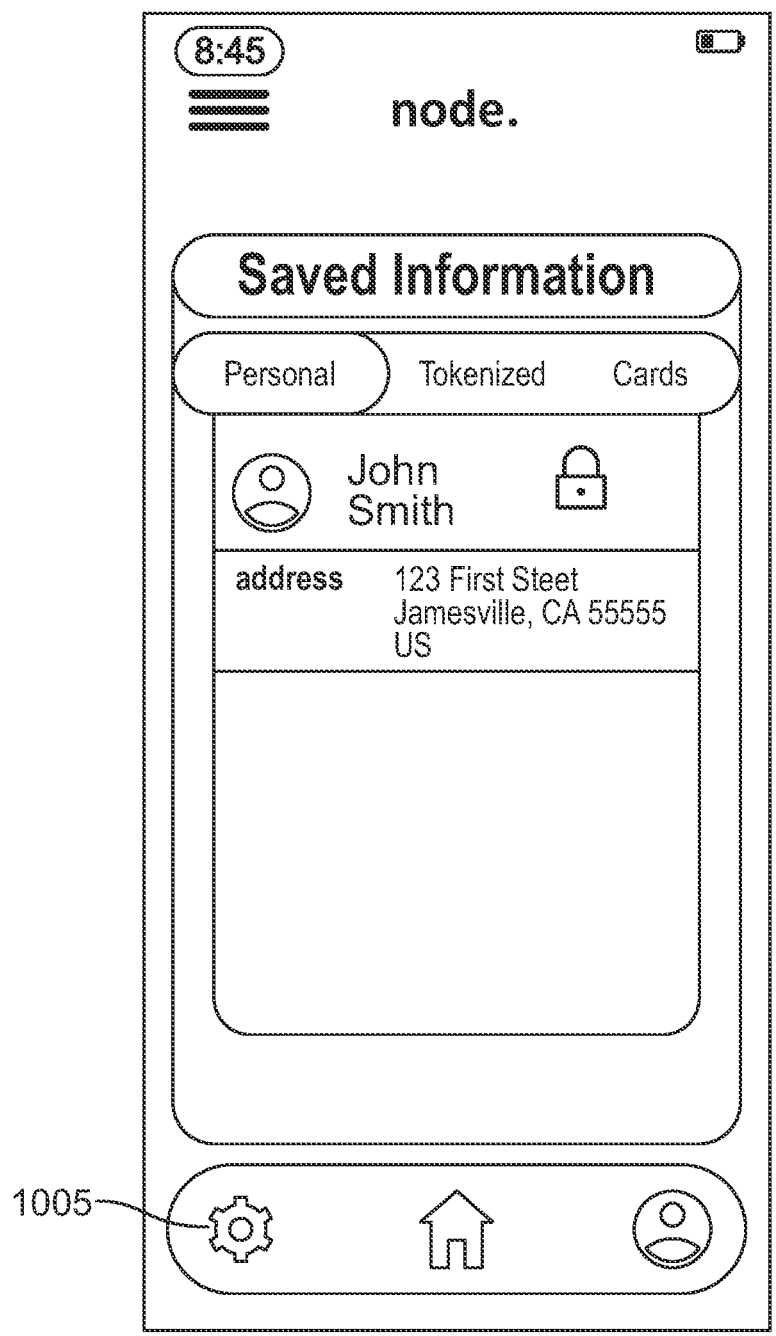
FIGS. 11A, 11B, and 11C are illustrations of exemplary GUIs for displaying stored personally identifiable information.

For illustrative purposes, an exemplary use and operation of the node logic 110 will be described in more detail below. In this regard, when a user initially launches the node logic 110, the node logic 110 may present the user with one or more GUIs for collecting tokenized and non-tokenized account information to be used in operation. As an example, the node logic 110 may present to the user at least one GUI for collecting non-tokenized personal information of the user, such as the user's actual name, age, birthdate, email address, home street address, shipping address, telephone number, or other information. Any such information provided by the user may be stored as the user's non-tokenized personal information in personally identifiable information 109. When desired, the user may view and/or edit such information by selecting icon 1105 of the GUI depicted by FIG. 11A. It should be noted that when a user edits the non-tokenized personally identifiable information 109, node logic 110 can communicate with online platforms that are associated with the edited non-tokenized personally identifiable information 109 so that online platforms are kept up to date with the non-tokenized edited personally identifiable information 109 automatically, without further input from the user. In response to selection of the icon 1105, the node logic 110 is configured to display non-tokenized personal information provided by the user, as shown by FIG. 11A.

Figure 11B:
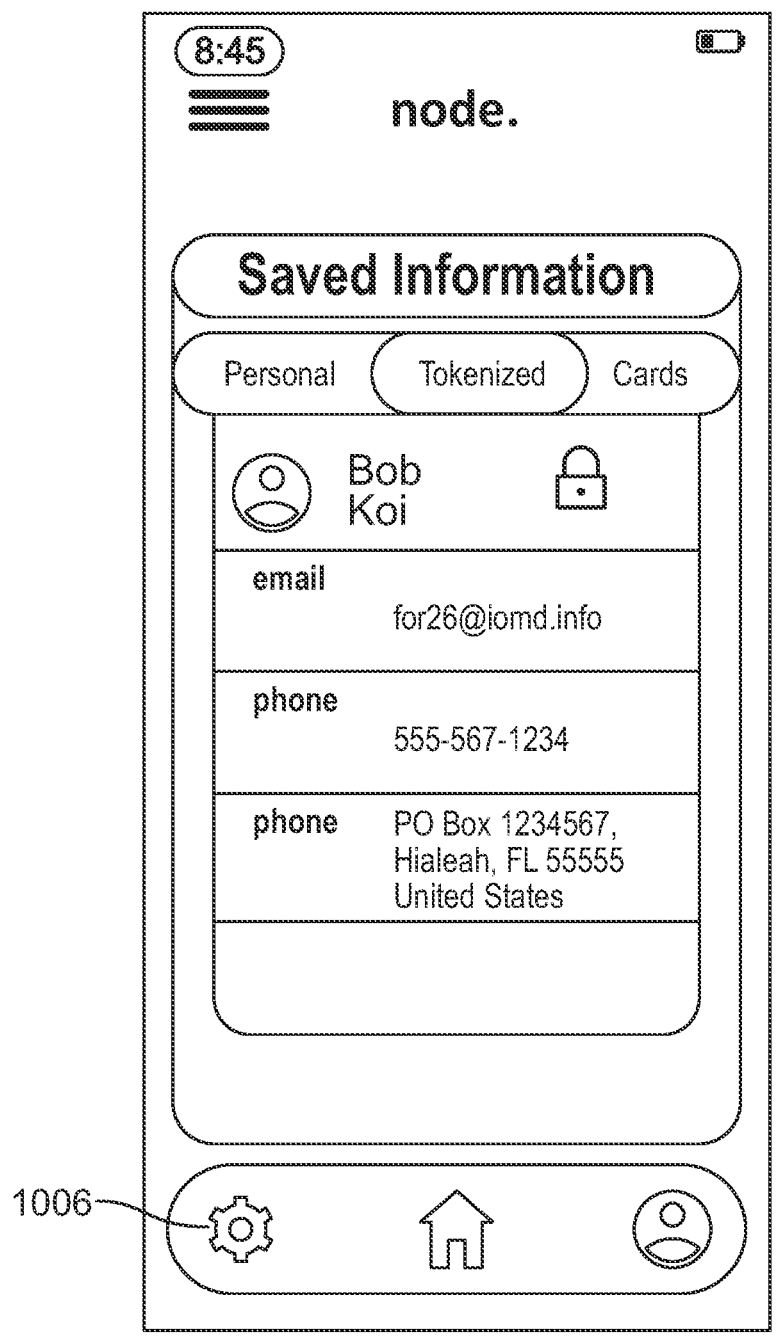

The node logic 110 may also present to the user at least one GUI for collecting tokenized personal information of the user, such as tokenized information representing a fake name, age, birthdate, email address, home street address, shipping address, telephone number, or other information. Any such information provided by the user may be stored as the user's tokenized personal information in personally identifiable information 109. If desired, the node logic 110 may be configured to automatically generate any of the data elements of the tokenized information since such information is not real. It should be noted that when a user edits the tokenized personally identifiable information 109, node logic 110 can communicate with online platforms that are associated with the tokenized edited personally identifiable information 109 so that online platforms are kept up to date with the tokenized edited personally identifiable information 109 automatically, without further input from the user. When desired, the user may view and/or edit the tokenized information by selecting icon 1106 of the GUI depicted by FIG. 11B. In response to selection of the icon 1106, the node logic 110 is configured to display stored tokenized personal information, as shown by FIG. 11B.

The node logic 110 may present to the user at least one GUI for collecting payment information for the user, such as credit card numbers or identifiers of other financial accounts for making payments. Any such information provided by the user may be stored as the user's payment information in personally identifiable information 109. When desired, the user may view and/or edit such information by selecting icon 1107 of the GUI depicted by FIG. 11C.

The node logic 110 is configured to maintain a list of online platforms with which the user is determined to interact and to store the list in the account access information 107. If a platform requires authentication credentials, such as a username and password, such authentication credentials may also be stored in the account access information 107 and used to log in when the user uses the device 101 to access the platform (e.g., direct a web browser to the web address of the platform). When the user accesses a platform not previously accessed, the node logic 110 may be configured to add an identifier of the platform to the list of platforms stored in the account access information 107. The identifier may be determined in various ways such as using at least a portion of the platform's web address or having the identifier entered by the user.

FIG. 8A depicts a GUI displaying the list of online platforms with which the user has interacted. In this regard, the GUI displays an icon for each such platform, and the icon includes the platform's identifier. For illustrative purposes, FIG. 8A shows only a single such icon 801 but there can be any number of platform icons 801 in other examples. The list of platform icons 801 may be displayed in response to selection of the icon 805 (labeled "Businesses").

If desired, the user may view the list of transactions that the node logic 110 has tracked for any of the platforms indicated by the displayed list. As an example, the user may view the list of interactions for the platform associated with icon 801 by selecting the icon 801 (thereby indicating which platform is of interest) and then selecting icon 807, labeled "Interactions" (thereby indicating that the user desires to view the list of transactions for the platform associated with the selected icon 801). In response, the node logic 110 displays the list of transactions tracked by it for the identified platform, as shown by FIG. 8B. In this regard, each transaction is indicated by an icon including an identifier indicative of the transaction type. For example, icon 821 represents a payment transaction for which the user was determined by the node logic 110 to have submitted a payment to the online platform. The icon 821 not only includes an identifier (i.e., "payment") that intuitively indicates the transaction type but also a timestamp indicating the date and time of the transaction. In addition, icon 822 represents a payment transaction for which the user was determined by the node logic 110 to have checked out for purchasing a good or service from the platform. The icon 822 not only includes an identifier (i.e., "checkout") that intuitively indicates the transaction type but also a timestamp indicating the date and time of the transaction. Icon 823 represents a login transaction for which the user was determined by the node logic 110 to have logged into the platform. The icon 823 not only includes an identifier (i.e., "login") that intuitively indicates the transaction type but also a timestamp indicating the date and time of the transaction. In other examples, other numbers and types of transactions may be tracked by the node logic 110. Returning to FIG. 8A node logic 110 can be configured to display more details associated with messages in response to the selection of icon 809, as will be further described with respect to FIG. 8D By selecting icon 821, node logic 110 displays more details associated with the payment, as shown by FIB. 8C. As shown, the details associated with the payment can include a card number used to complete the payment, an URL associated with the business indicated by icon 801 (in this case, ABCD Corp.), and the name associated with the payment (e.g., an item of personally identifiable information 109), which may be a tokenized name or true name, depending on the selections made by the user. FIG. 8D illustrates how messages from the online platform may also be displayed. In response to selecting icon 809, node logic 110 can display the information shown in FIG. 8D. For example, the message can provide the user with information related to a recently placed order.

Note that the node logic 110 may present the user with an option to share the transaction information with the platform for which the transaction information is associated. If the user selects such option, then the details of the tracked transactions may be provided to the platform when the user is interacting with the platform, such as when the user logs into the platform. Such transaction information may be used by the platform to ascertain a level of trust for the user. For example, if the transaction information indicates that the user has engaged in many transactions with the online platform, then the platform may assign a higher level of trust to the user, which may affect decisions about the user such as whether to extend credit, offer discounts, or ship products to the user. Thus, the node logic 110 is configured to provide the online platform with sufficient transaction information to make various decisions about the user to achieve benefits similar to conventional server-side platforms, as described above. However, such benefits are realized without requiring the platform to be the custodian of the user's data, which instead is stored and maintained on the user device 101.

In some embodiments, the user may elect not to share the transaction information with the online platform. In such case, the node logic 110 may be configured to provide the online platform with information that may be used to ascertain a level of trust for the user without providing the specific details of the transactions tracked by the node logic 110. As an example, the node logic 110 may be configured to analyze the transactions associated with the online platform and calculate one or more user interaction scores indicating generic information about the transactions. For example, the node logic 110 may calculate a purchase score indicating a number of purchases made by the user from the online platform. In this regard, if the user has made a number of purchases in a first range (e.g., 0 to 5), the purchase score may have a first value (e.g., 1) and if the user has made a number of purchases in a second range (e.g., 6 to 10), the purchase score may have a second value (e.g., 2). A similar score may be calculated for other types of transactions. For example, when providing a shipping address, the node logic 110 may provide a shipping address score indicating a number of times that the business associated with the online platform has shipped a good to that shipping address. Based on such information, the online platform may make a decision about whether to permit the user to purchase a product and have the product shipped to such shipping address. Various other types of scores and decisions may be used or made in other embodiments.

Figure 9A:
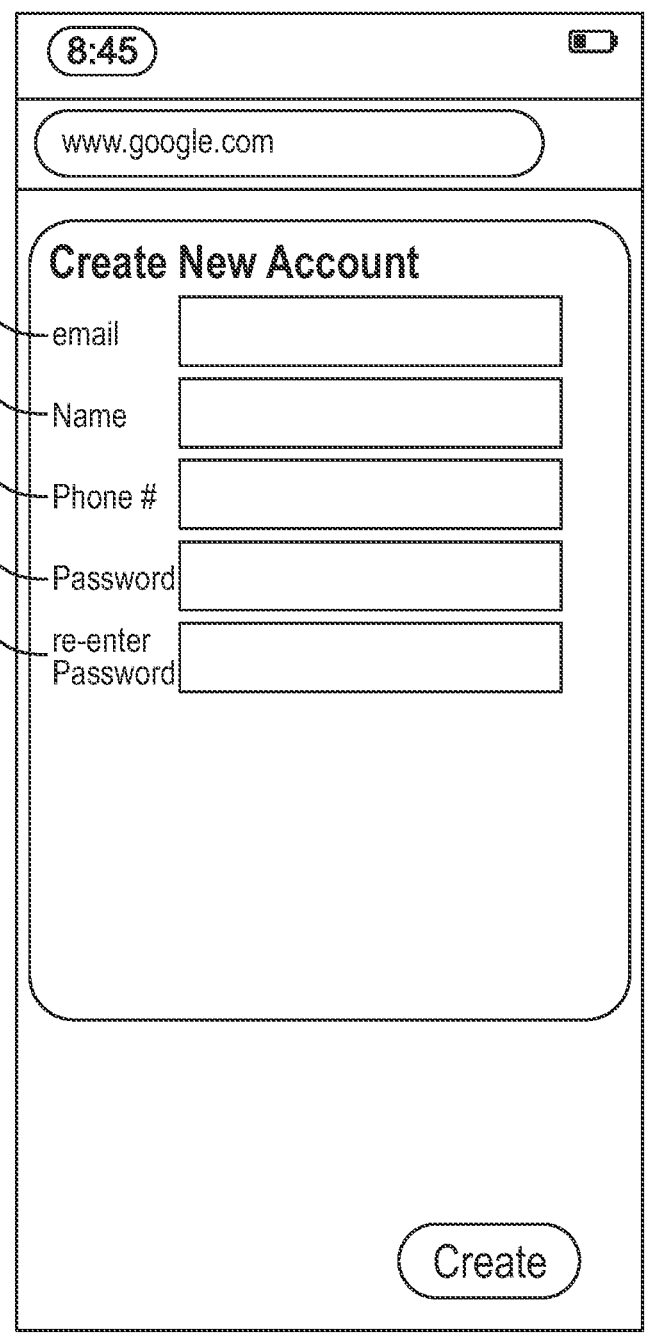
FIGS. 9A, 9B, 9C, 9D, 9E, 9F, 9G, 9H, and 9I are illustrations of exemplary GUIs for creating a new user account.
Figure 9B:
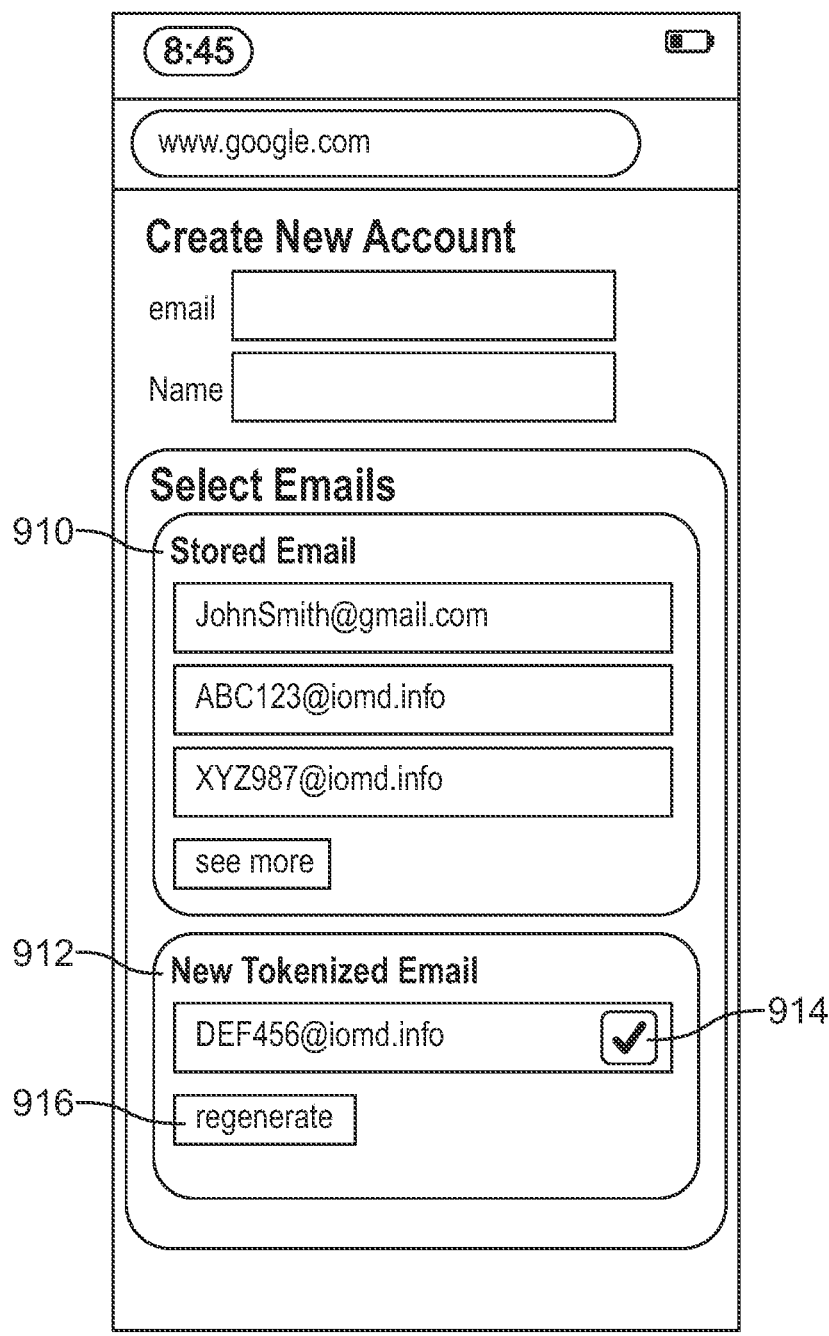
Figure 9C:
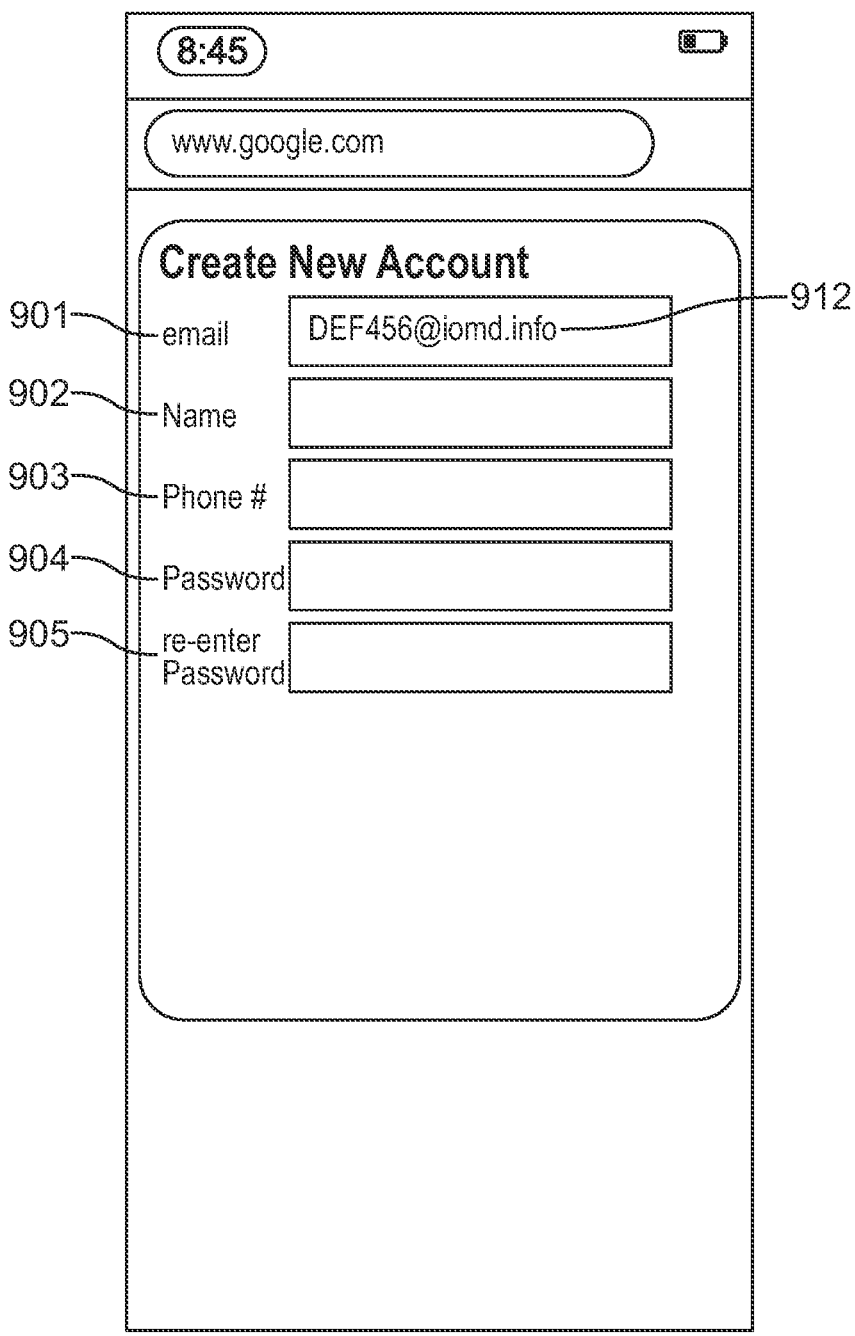

FIGS. 9A-9I are illustrations of exemplary GUIs for creating a new user account. As shown by the figures, when a user initiates the creation of a new account, information from the personally identifiable information 109, in addition to newly generated tokenized personally identifiable information, may be used to provide the information required by the online platform to create the new account. In particular, FIG. 9A shows how a user may, interact with a web page of an online platform through a web browser on the user device 101 to initiate creating a new account with an online platform. As shown, the web page of an online platform may have several fields that user may fill in order to create an account. As an example, the web page may include an email field 901, a name field 902, a phone number field 903, a password field 904, and a password confirmation field 905, although more or less fields may appear on a web page of online platform to initiate creating a new account in some examples. FIGS. 9B and 9C show how information requested by the online platform may be automatically displayed to the user for selection. For example, node logic 110, in response to determining the user's goal is to create a new account, provides stored email addresses 910 that the user can select from in creating the account as shown in FIG. 9B. Notably, the stored emails can include both tokenized email addresses and non-tokenized email addresses. If the user desires, the user can select a new tokenized email address 912 by selecting icon 914. The new tokenized email address can be regenerated by selecting icon 916. Following the selection of icon 914, a new tokenized email address is filled in for the email field on the new account creation screen, as shown in FIG. 9C.

Figure 9D:
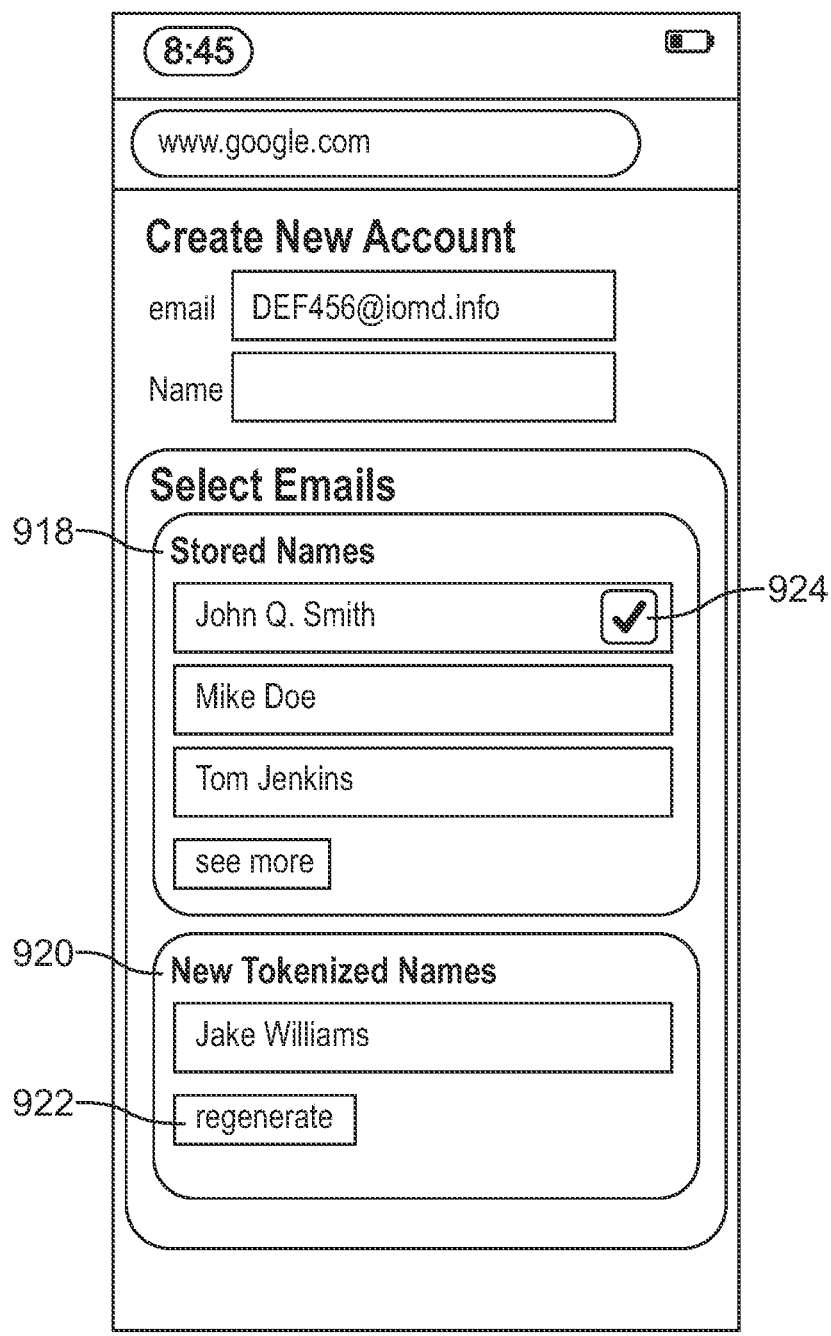
Figure 9E:
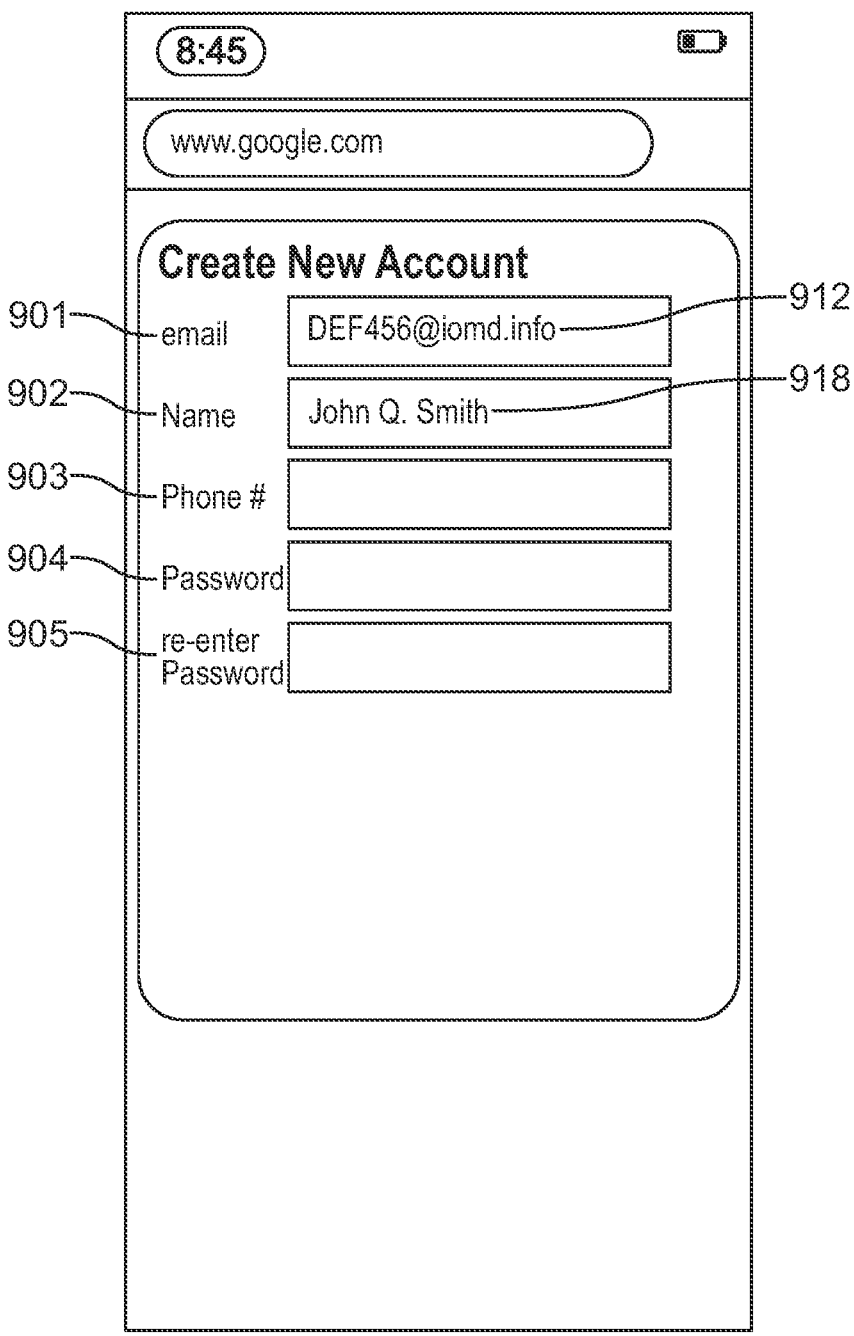
Figure 9F:
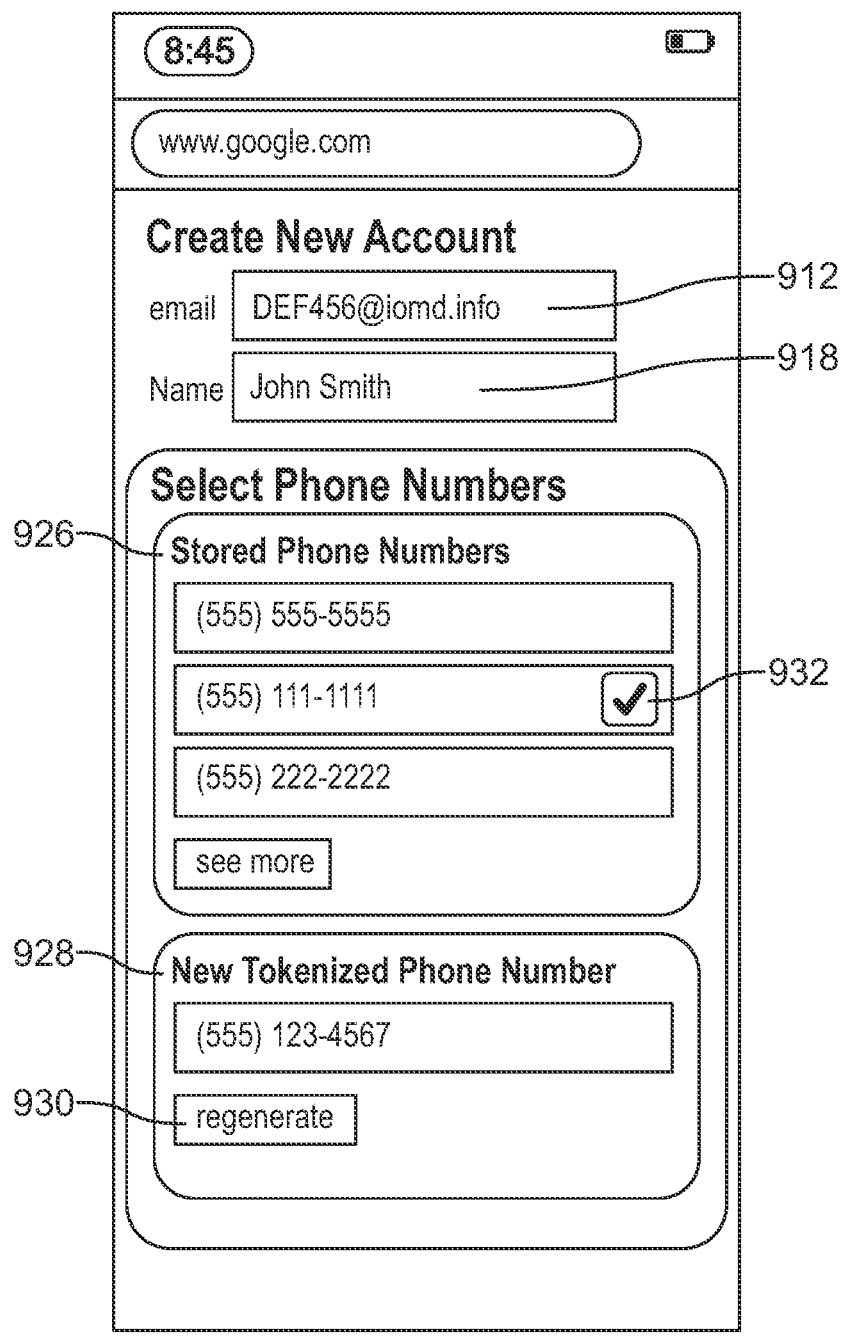
Figure 9G:
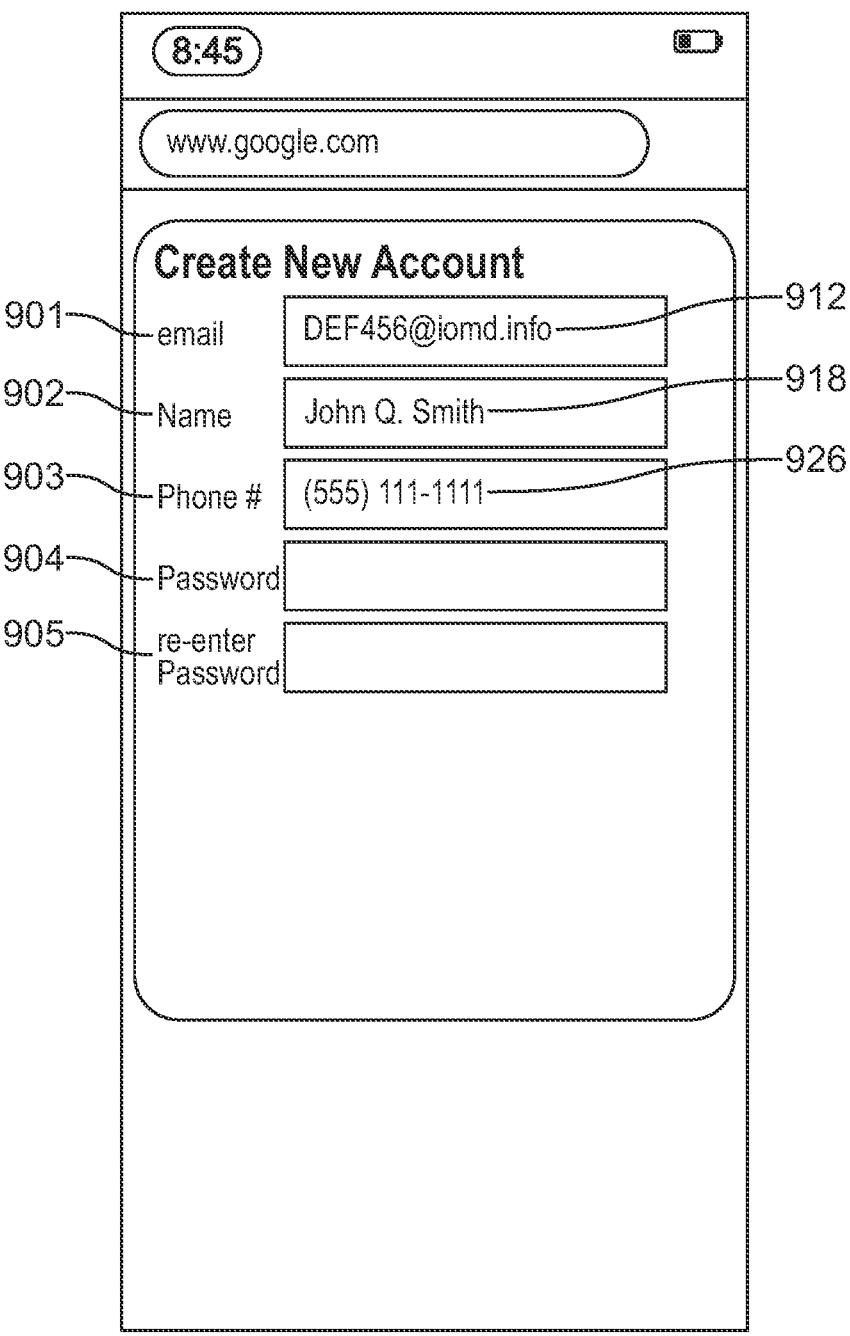

Upon selecting name field 902, node logic 110 provides a list of stored names 918 from which the user can select from, as shown in FIG. 9D. Notably the stored names can include tokenized names and non-tokenized names. Additionally, node logic 110 provides the option to select a new tokenized name 920. The new tokenized name 920 can also be regenerated by selecting icon 922. In response to selecting icon 924, the user can select a stored name "John Q. Smith," which node logic 110 automatically can fill in, as shown in FIG. 9E. Upon user selecting phone number field 903, node logic 110 provides a list of stored phone numbers 926, as shown in FIG. 9F. Additionally, node logic 110 can provide the option to select a new tokenized phone number 928. The user may also regenerate a new tokenized phone number as desired, by selecting icon 930. In response to selecting icon 932, the user may select a previously stored phone number to enter into the web page of online platform, as shown in FIG. 9G.

Figure 9H:
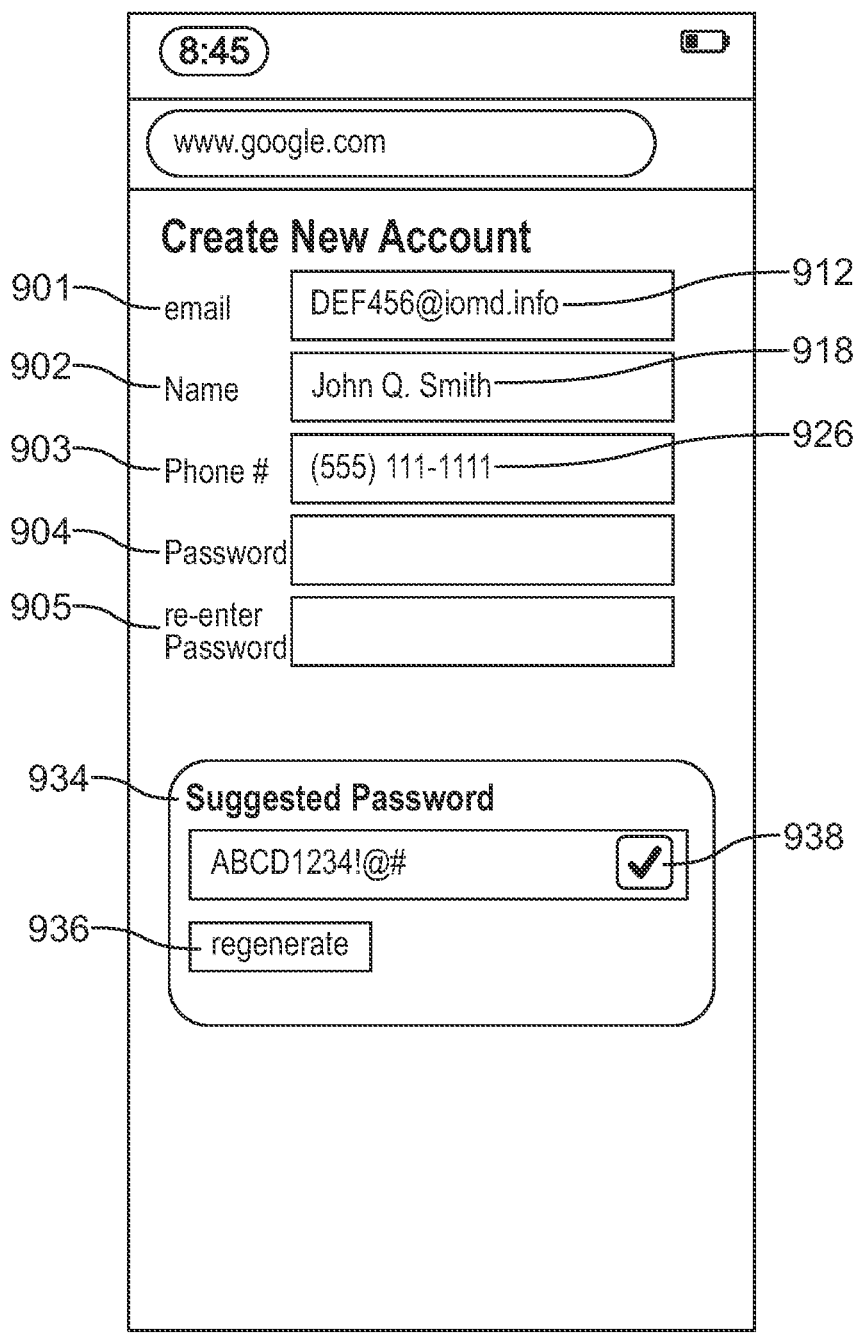
Figure 9I:
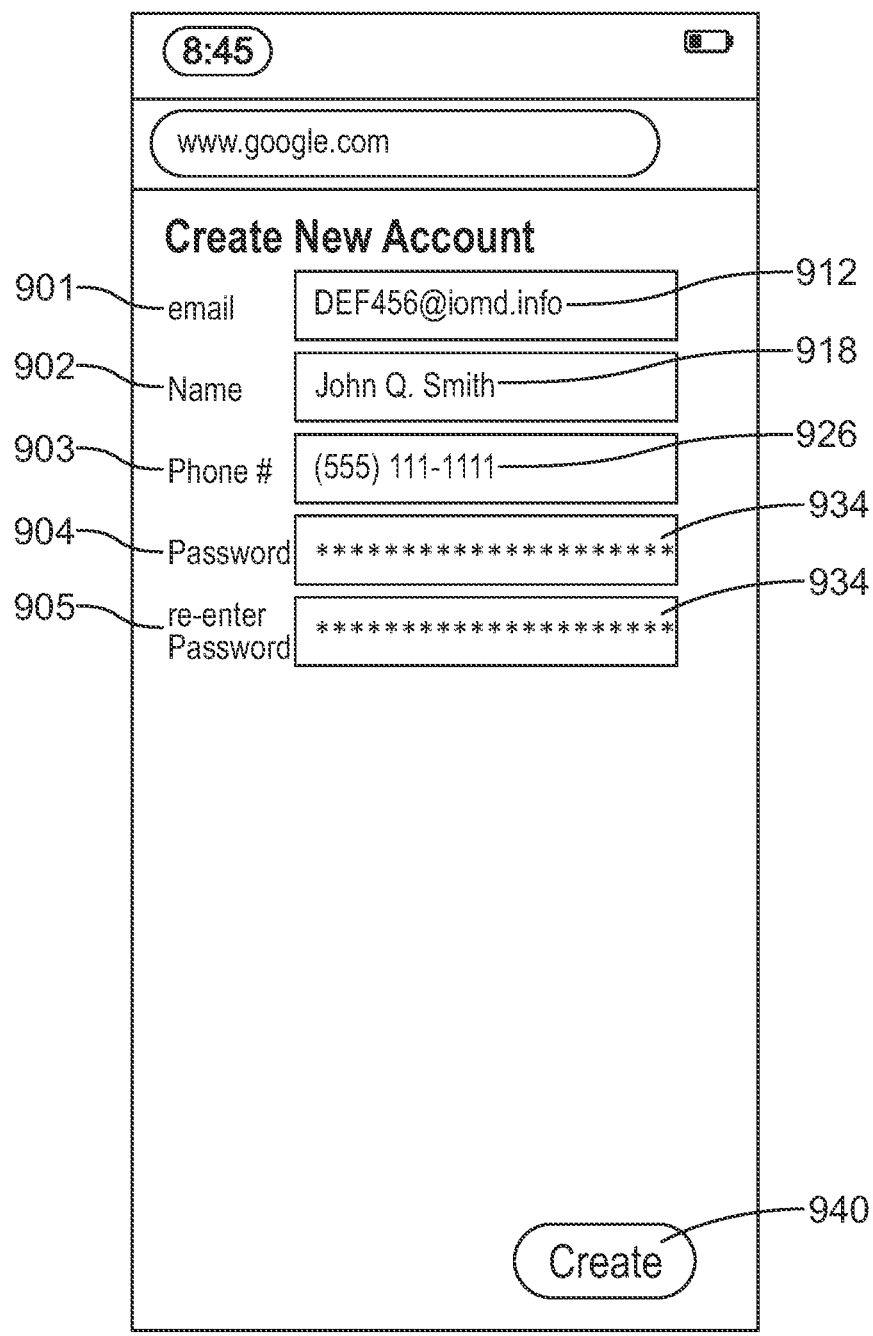

In response to selecting password field 904, node logic 110 may be configured to display a suggested password 934, as shown in FIG. 9H. If the user desires, the suggested password can be regenerated by selecting icon 936. In response to selecting icon 938, the suggested password may be selected for input on the web page of online platform. As shown in FIG. 9I, node logic 110 can automatically fill out both password field 904 and password confirmation filed 905 with the suggested password 934. Should the user desire to proceed with creating the account, the user may select icon 940 to create the account with online platform.

Figure 10A:
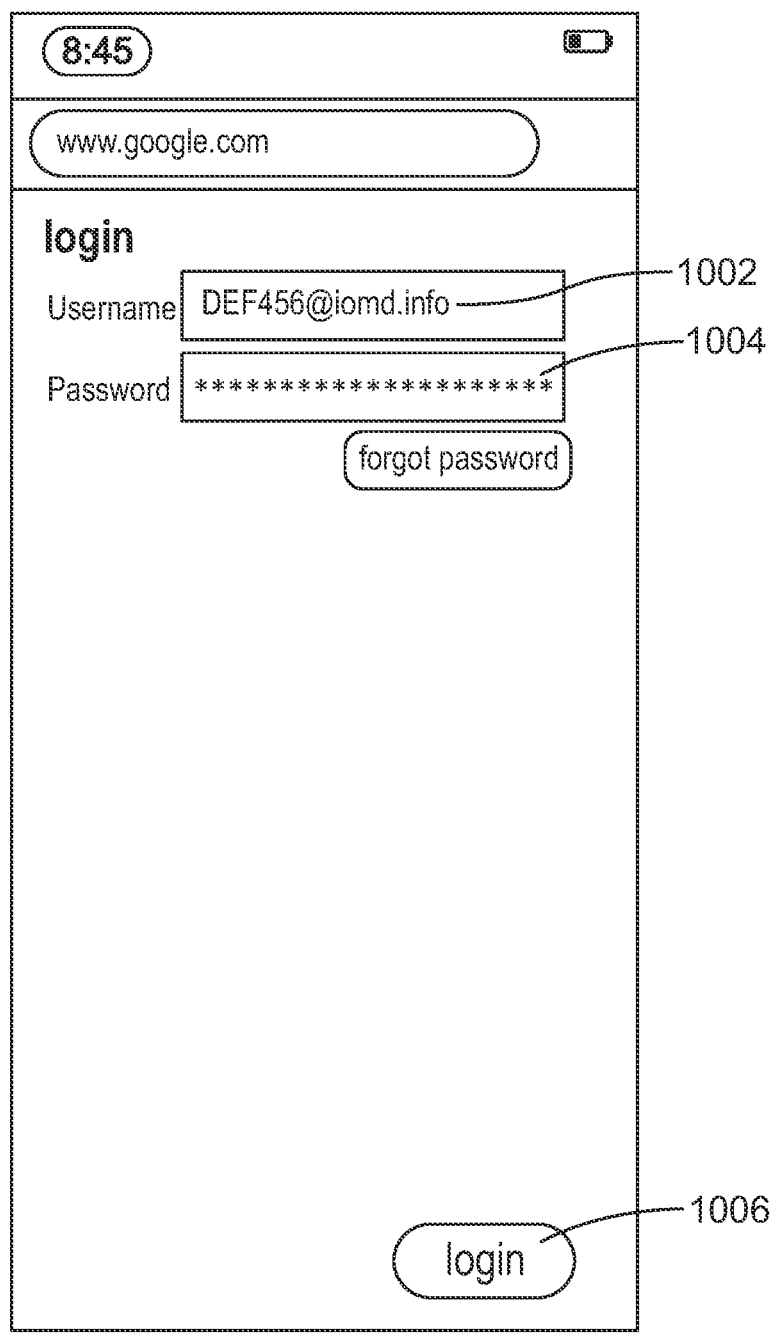
FIGS. 10A, 10B, and 10C are illustrations of exemplary GUIs for logging in to an existing user account.
Figure 10B:
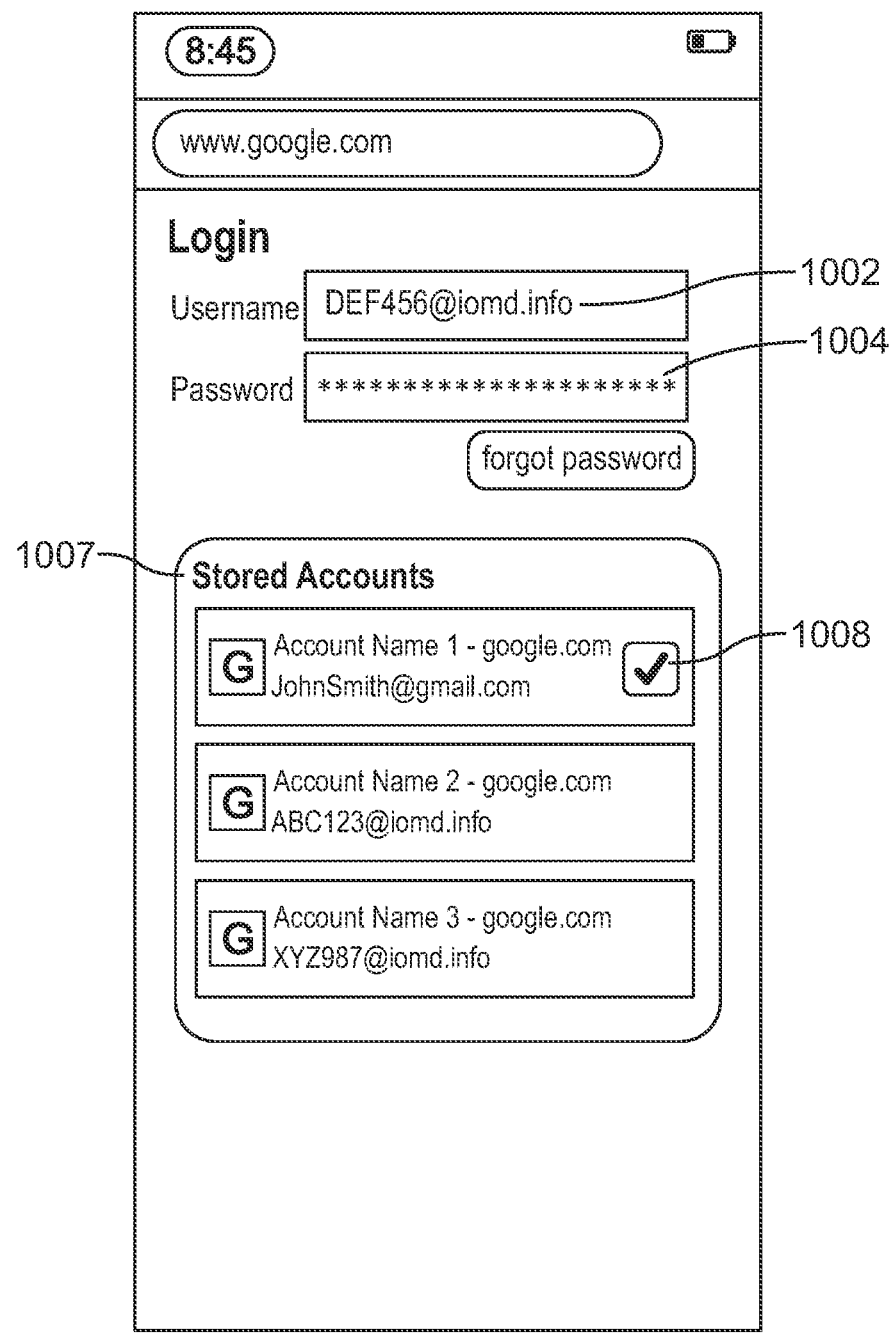
Figure 10C:
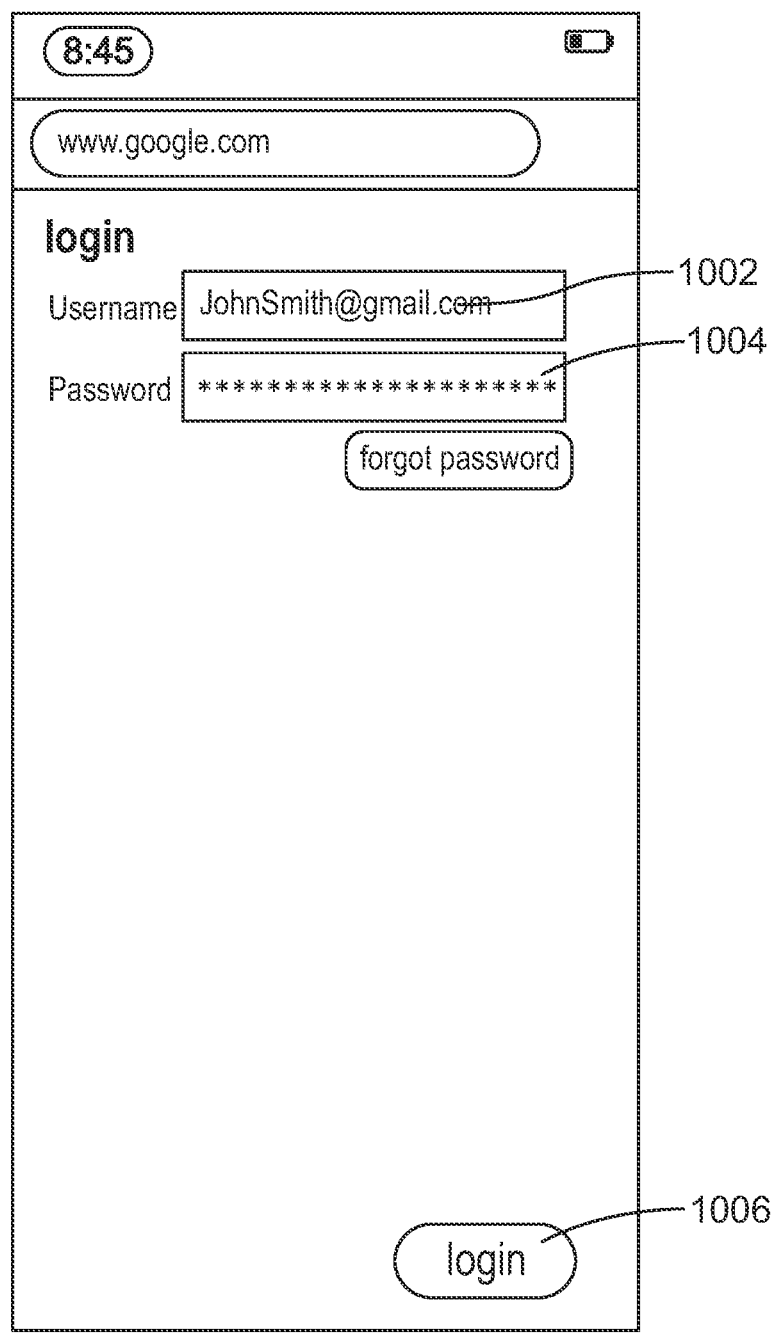

FIGS. 10A, 10B, and 10C are illustrations of exemplary GUIs for logging in to an existing user account. As shown by the figures, when a user attempts to log in to an account with an online platform, information from the account access information 107 may be used to provide the information required by the online platform to log in to the selected account. In particular, FIG. 10A shows how a user may, interact with a web page of an online platform through a web browser on the user device 101 to initiate logging in to an existing account of an online platform. For example, node logic 110 can determine the user's current goal is logging into the online platform. Node logic 110 can identify one or more stored profiles associated with the online platform and automatically fill the username field 1002 and the password field 1004 with an appropriate username and password pulled from account access information 107. The user can select the login icon 1006 in order to proceed with logging into the online platform. FIG. 10B shows how accounts stored in the account access information 107 may be automatically displayed to the user for selection. In response to selecting icon 1008 that selects one of the stored accounts 107, node logic 110 may automatically fill in the selected stored account information into the username field 1002 and password field 1004, as shown in FIG. 10C. FIG. 10C shows how a user may select from a variety of existing data from the account access information 107 and how the access credentials for the selected account may be used to provide the information required by the online platform to log in to the selected account. Once the account access information 107 is filled in, the user may select login icon 1006 to complete the login process to the online platform.

Figure 11C:
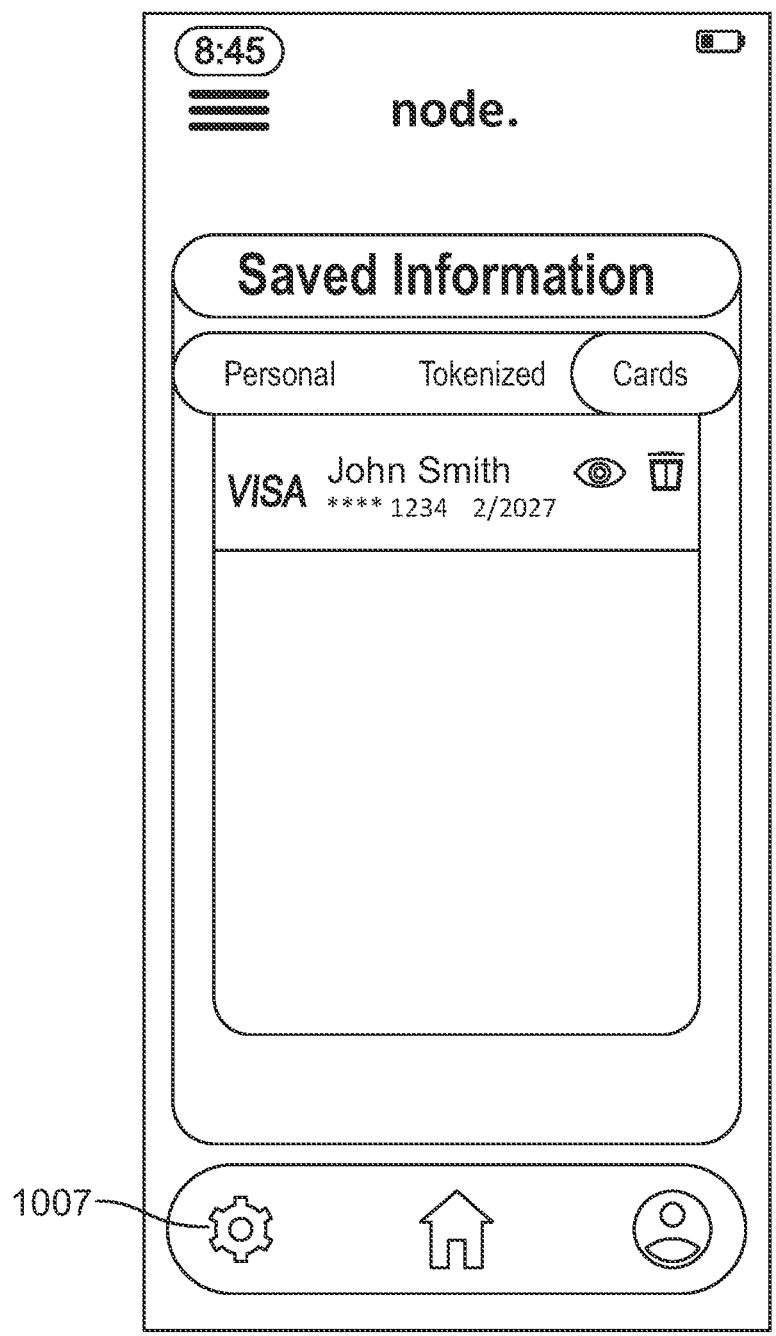

FIGS. 11A, 11B, and 11C are illustrations of exemplary GUIs for displaying various stored personally identifiable information. As shown by the figures, a variety of types of personally identifiable information 109 may be stored. In particular, FIG. 11A shows how non-tokenized personal information may be grouped into identities and may include particular types of personal information such as email-address, mailing address, phone number, and similar types of information. FIG. 11B shows how tokenized personal information may also be grouped into identities and may also include particular types of personal information, such as (tokenized) email-addresses, (tokenized) mailing addresses, and (tokenized) phone numbers. FIG. 11C shows how financial information, such as credit card numbers, may also be stored as part of the personally identifiable information 109.

Figure 12A:
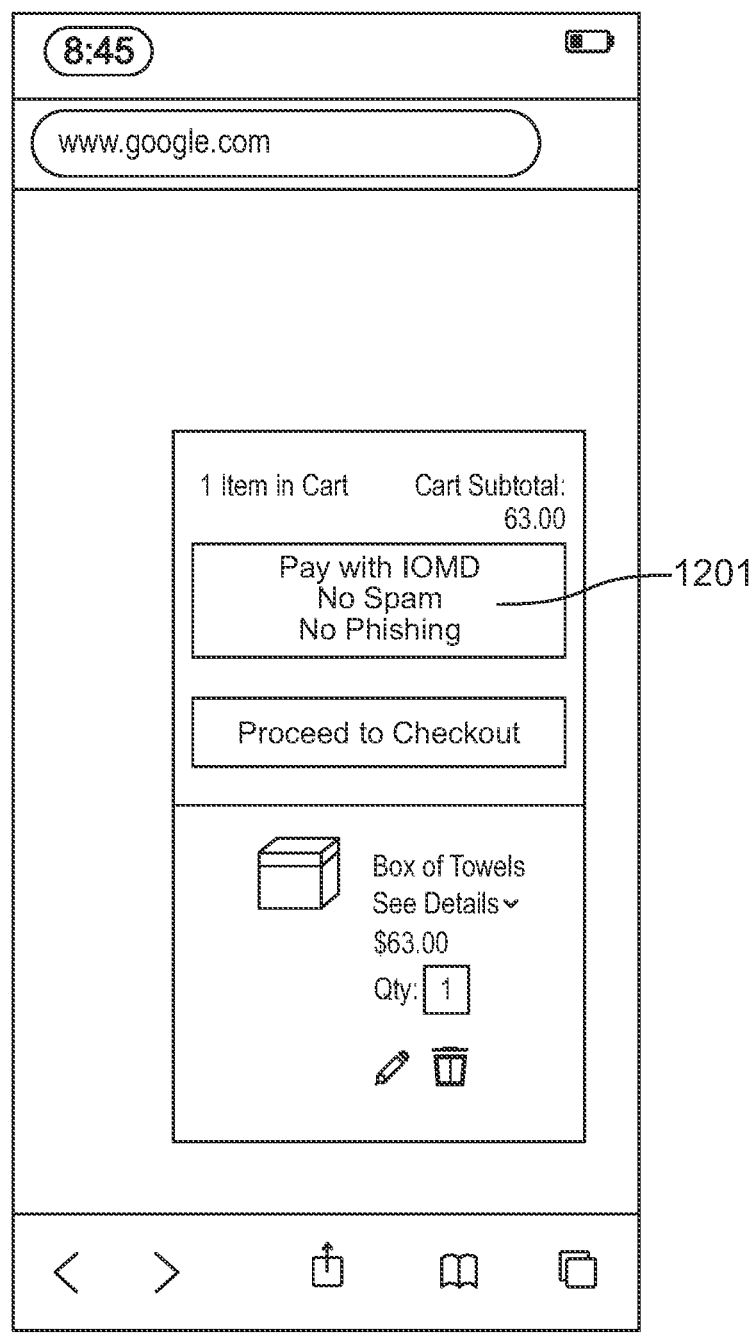
FIGS. 12A, 12B, 12C, 12D, and 12E are illustrations of exemplary GUIs for utilizing stored personally identifiable information to make a purchase.
Figure 12B:
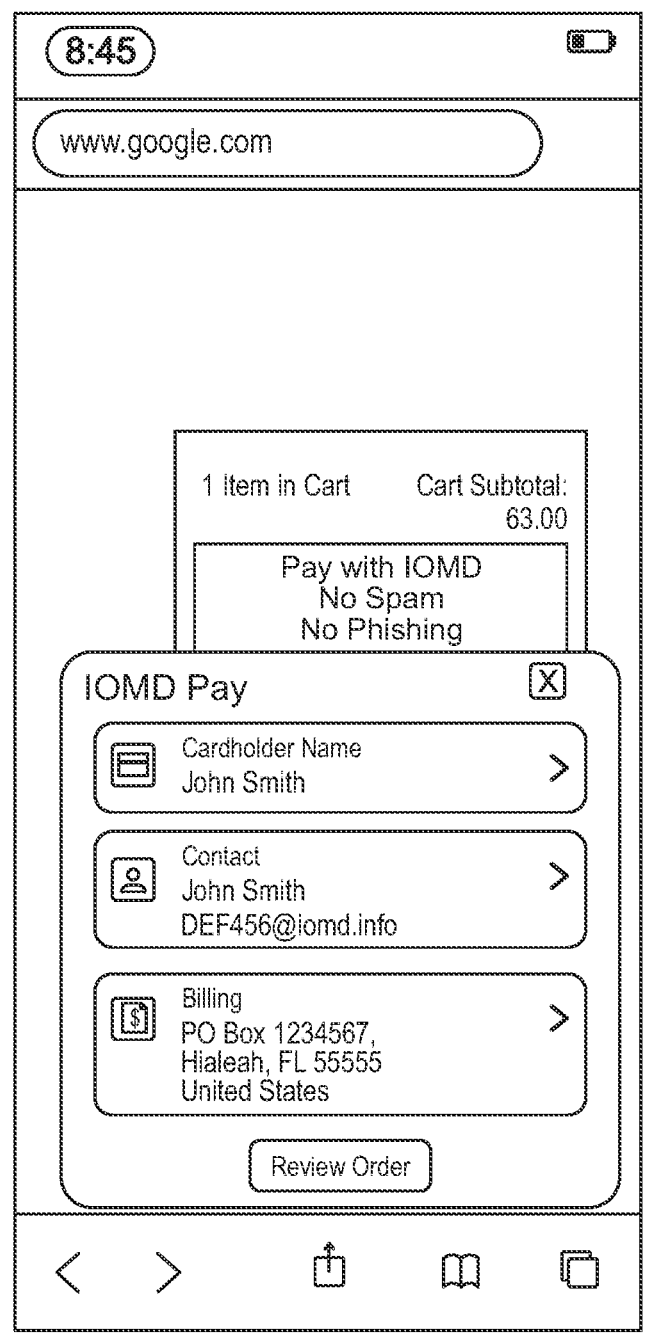
Figure 12C:
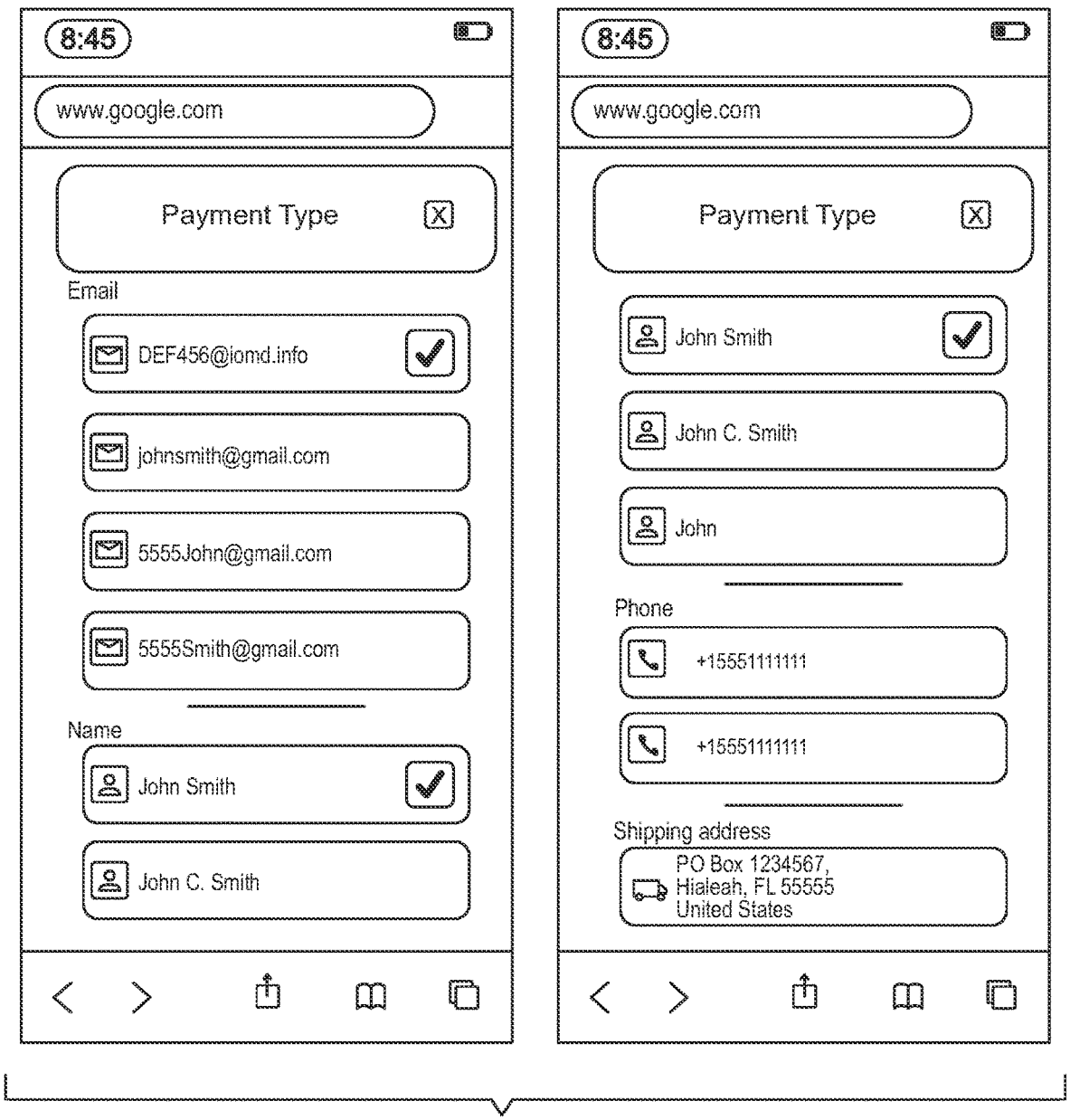
Figure 12D:
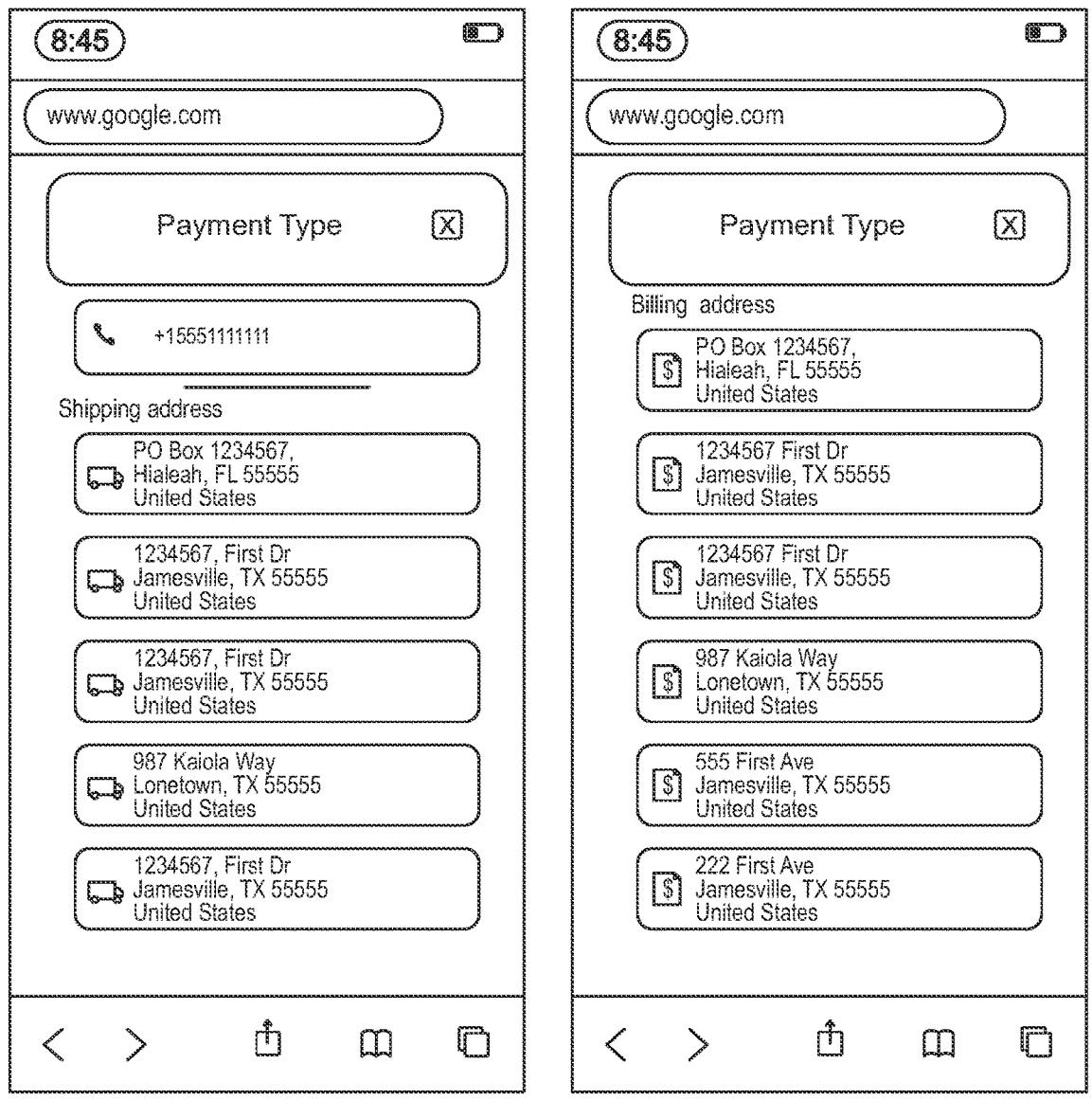
Figure 12E:
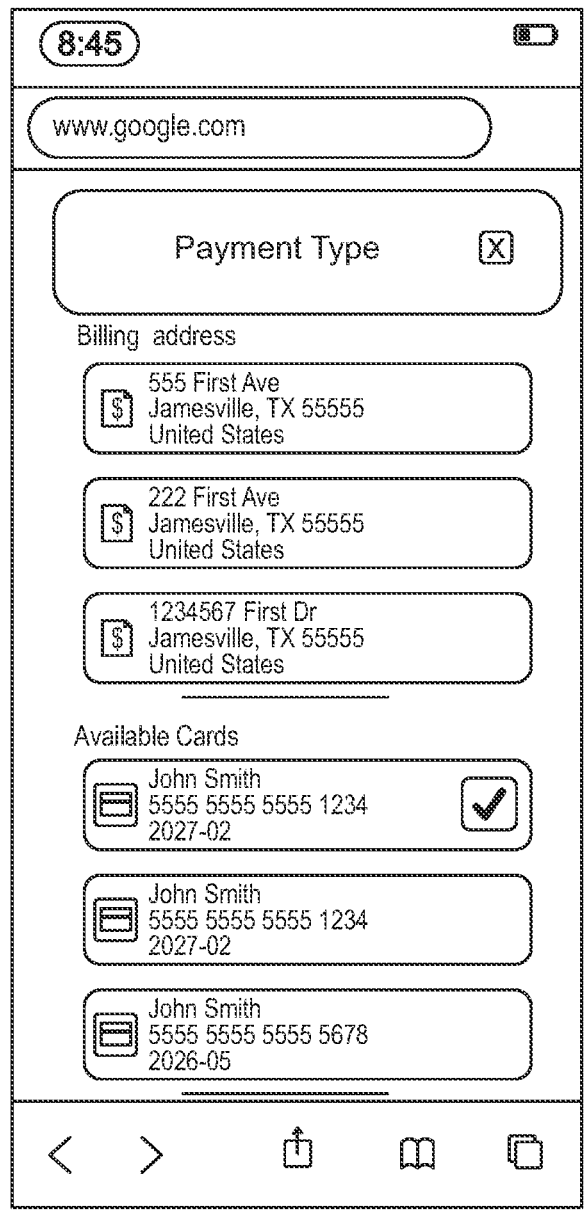

FIGS. 12A, 12B, 12C, 12D, and 12E are illustrations of exemplary GUIs for utilizing stored personally identifiable information to make a purchase on an online platform. As shown by the figures, when a user initiates the purchase of an item, information from the personally identifiable information 109, in addition to newly generated tokenized personally identifiable information, may be used to provide the information required by the online platform to complete the purchase. In particular, FIG. 12A shows how a user may interact with a web page of an online platform through a web browser on the user device 101 to initiate purchasing an item with an online platform. FIG. 12B shows how information requested by the online platform may be automatically displayed to the user for selection. FIGS. 12C, 12D, and 12E show how a user may select from a variety of existing data from the personally identifiable information 109 and from newly generated tokenized personally identifiable information to be provided to the online platform so as to complete the transaction.

More specifically, when the user attempts to purchase an item (e.g. a service or good) from an online platform, the user may be presented by the platform with various payment options, as shown by FIG. 12A. If the user wishes to utilize a payment option provided by the node logic 110, the user may select icon 1201. Upon such selection, the GUI shown by FIG. 12B may be displayed. Such GUI displays default information to be used for the purchase (e.g., to be provided to the online platform), such as the user's name, email address, and information about a credit card (or other financial account) to be used for the purchase, including for example cardholder name and billing address. Other information may also be displayed, such as shipping address, for example.

If the user desires, he or she may change the information to be provided. For example, the user may provide an input to see a list of options for various information. FIGS. 12C, 12D, and 12E show exemplary options for an email address, user's name, user's phone number, billing address, and shipping address, and the user can select what information to provide for each such category of information. Note that in the figures, a check mark is used to designate which item is currently selected. Note that some of items may be real and some may be tokenized. For example, FIG. 12C shows a list of email addresses, some of which may be real and some of which may be tokenized. The user has the option of selecting a real email address or a tokenized one. Similarly, the user may select real or tokenized information for each of the user's name, billing address, and shipping address. As an example, the user may select a tokenized email address and name in order to hide the user's real email address and name from the online platform. However, the user may select his or her real billing address to ensure that the payment is accepted, and the user may select his or her real shipping address to ensure that the purchased product is delivered to the correct location. The node logic 110 is configured to provide the selected items of information (some of which could real and some of which could be tokenized) to the online platform in order to complete the purchase.

In some examples, node logic 110 can be configured to allow the user to intuitively reorder one or more purchases previously made with a respective online platform. Returning to FIG. 8B, icon 822 allows the user to quickly reorder or "buy again" a purchase that was previously made by the user. Accordingly, the purchase may be reordered using previously stored account access information 107 (e.g., username and/or password) and/or personally identifiable information 109 (e.g., shipping address). In some examples, when the user wishes to reuse the same personally identifiable information 109 and account access information 107 for the reordering, node logic 110 can allow the item to be reordered without any further input from the user by reusing the account access information 107 and personally identifiable information 109 from the original order.

The devices, modules, and other functional units described in this disclosure can be implemented by hardware, or software, or a combination of hardware and software. In some embodiments, functions described as being implemented in hardware may instead be implemented in software or a combination of hardware and software. Likewise, in some embodiments, functions described as being implemented in software may instead be implemented in hardware or a combination of hardware and software. If something is implemented by software, it may be stored in a non-transitory computer-readable media. Such software, when executed by a processor, may perform the function of the device, module or other functional unit the software is implementing. The above described devices, modules, and other functions units may also be combined or may be further divided into a plurality of sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

Now, therefore, the following is claimed:

1. A method for managing user data associated with online platforms, comprising: monitoring, with a user device, a plurality of interaction events occurring during interactions with a plurality of online platforms by the user device;
    storing interaction information in memory of the user device, the interaction information including first entries of data, wherein each of the first entries indicates details of a respective one of the plurality of interaction events, the details including at least an event type for the respective interaction event and a time associated with the respective interaction event;
    analyzing the first entries with the user device;
    calculating, with the user device based on the analyzing, at least one user interaction score indicative of an amount of verified interactions between a user of the user device and at least one of the plurality of online platforms;
    providing, by the user device, the at least one user interaction score to a first online platform for use in assessing trust in information provided by the user to the first online platform;
    permitting the user to control whether to provide at least one of the first entries to the first online platform;
    receiving, with the user device, first user input indicating that at least one of the first entries is to be provided to the first online platform; and
    providing at least one of the first entries to the first online platform based on the first user input.

2. The method of claim 1, further comprising:
    permitting the user to control whether to provide the at least one user interaction score to the first online platform;
    receiving, with the user device, first user input indicating that the at least one user interaction score is to be provided to the first online platform; and
    providing the at least one user interaction score to the first online platform based on the first user input.

3. The method of claim 1, further comprising reordering a previous purchase made by the user of the user device by: displaying to the user one of the first entries indicating a purchase of at least one item by the user; receiving, with the user device, second user input selecting the one of the first entries displayed to the user; and
    providing, by the user device and without further input from the user, information from the first entry to the first online platform for requesting a purchase of the at least one item.

4. A method for managing user data associated with online platforms, comprising:
    storing account access information in memory of a user device, the account access information including first entries of data for accessing one of a plurality of user accounts of online platforms;
    permitting a user of the user device to select which of the first entries to use for accessing each respective user account of the plurality of user accounts;
    receiving, with the user device, first user input for selecting which of the first entries to provide to a first online platform for accessing a first user account of the plurality of user accounts, the first user input indicating selection of the at least one of the first entries;
    causing the user device to transmit the selected first entries from the user device to the first online platform;
    monitoring a plurality of events occurring during interactions with the online platforms by the user device;
    storing interaction information in the memory of the user device, the interaction information including second entries of data, wherein each of the second entries indicates details of a respective one of the plurality of events, the details including at least an event type for the respective interaction event and a time associated with the respective interaction event;
    associating at the user device each of a plurality of the second entries with a respective one of the plurality of user accounts, wherein at least one of the plurality of second entries is associated with the first user account;
    permitting, by the user device, the user to view the interaction information grouped according to the associating; analyzing the second entries with the user device;
    calculating, with the user device based on the analyzing, at least one user interaction score indicative of an amount of verified interactions between the user of the user device and at least one of the plurality of online platforms; and
    providing the at least one user interaction score to a second online platform for use in assessing trust in information provided by the user to the second online platform.

5. The method of claim 4, further comprising: permitting the user to control whether to provide the at least one user interaction score to the second online platform;
    receiving, with the user device, second user input indicating that the at least one user interaction score is to be provided to the second online platform; and providing the at least one user interaction score to the second online platform based on the second user input.

6. The method of claim 4, wherein at least one of the first entries includes a first tokenized account identification element and wherein the first tokenized account identification element corresponds to an email address associated with the user.

7. A user device for managing user data associated with online platforms, comprising:
   memory; and at least one processor programmed with instructions that, when executed by the at least one processor, cause the at least one processor to: monitor, with the user device, a plurality of interaction events occurring during interactions with a plurality of online platforms by the user device; store interaction information in memory of the user device, the interaction information including first entries of data, wherein each of the first entries indicates details of a respective one of the plurality of interaction events, the details including at least an event type for the respective interaction event and a time associated with the respective interaction event;
   analyze the first entries with the user device; calculate, with the user device based on the analyzing, at least one user interaction score indicative of an amount of verified interactions between a user of the user device and at least one of the plurality of online platforms; and provide, with the user device, the at least one user interaction score to a first online platform for use in assessing trust in information provided by the user to the first online platform;
   permit the user to control whether to provide the at least one user interaction score to the first online platform; receive, with the user device, first user input indicating that the at least one user interaction score is to be provided to the first online platform; and
   provide the at least one user interaction score to the first online platform based on the first user input.

8. The device of claim 7, wherein the instructions further cause the at least one processor to:
   permit the user to control whether to provide at least one of the first entries to the first online platform;
   receive, with the user device, first user input indicating that at least one of the first entries is to be provided to the first online platform; and
   provide at least one of the first entries to the first online platform based on the first user input.

9. The device of claim 7, wherein the instructions further cause the at least one processor to reorder a previous purchase made by the user of the user device by:
   displaying to the user one of the first entries indicating a purchase of at least one item by the user;
   receiving, with the user device, second user input selecting the one of the first entries displayed to the user; and
   providing, by the user device and without further input from the user, information from the first entry to the first online platform for requesting a purchase of the at least one item.

10. The method of claim 4, further comprising reordering a previous purchase made by the user of the user device by: displaying to the user one of the second entries indicating a purchase of at least one item by the user; receiving, with the user device, second user input selecting the one of the second entries displayed to the user; and providing, by the user device and without further input from the user, information from the second entry to the first online platform for requesting a purchase of the at least one item.

11. A user device for managing user data associated with online platforms, comprising:
   memory; and at least one processor programmed with instructions that, when executed by the at least one processor, cause the at least one processor to: store account access information in the memory of the user device, the account access information including first entries of data for accessing one of a plurality of user accounts of online platforms;
   permit a user of the user device to select which of the first entries to use for accessing each respective user account of the plurality of user accounts;
   receive, with the user device, first user input for selecting which of the first entries to provide to a first online platform for accessing a first user account of the plurality of user accounts, the first user input indicating selection of the at least one of the first entries;
   cause the user device to transmit the selected first entries from the user device to the first online platform;
   monitor a plurality of events occurring during interactions with the online platforms by the user device;
   store interaction information in the memory of the user device, the interaction information including second entries of data, wherein each of the second entries indicates details of a respective one of the plurality of events, the details including at least an event type for the respective interaction event and a time associated with the respective interaction event;
   associate at the user device each of a plurality of the second entries with a respective one of the plurality of user accounts, wherein at least one of the plurality of second entries is associated with the first user account; and
   permit, by the user device, the user to view the interaction information grouped according to the associating; analyze the second entries with the user device; calculate, with the user device based on the analyzing, at least one user interaction score indicative of an amount of verified interactions between the user of the user device and at least one of the plurality of online platforms; and provide the at least one user interaction score to a second online platform for use in assessing trust in information provided by the user to the second online platform.

12. The device of claim 11, wherein the instructions further cause the at least one processor to:
   permit the user to control whether to provide the at least one user interaction score to the second online platform; receive, with the user device, second user input indicating that the at least one user interaction score is to be provided to the second online platform; and provide the at least one user interaction score to the second online platform based on the second user input.

13. The device of claim 11, wherein at least one of the first entries includes a first tokenized account identification element and wherein the first tokenized account identification element corresponds to an email address associated with the user.

14. The device of claim 11, wherein the instructions further cause the at least one processor to reorder a previous purchase made by the user of the user device by:
   displaying to the user one of the second entries indicating a purchase of at least one item by the user;
   receiving, with the user device, second user input selecting the one of the second entries displayed to the user; and
   providing, by the user device and without further input from the user, information from the second entry to the first online platform for requesting a purchase of the at least one item.

* * * * *